(12) United States Patent
Ohmura et al.

(10) Patent No.: US 6,462,674 B2
(45) Date of Patent: Oct. 8, 2002

(54) COMMUNICATION APPARATUS AND ITS CURRENT POSITION COMMUNICATION METHOD, NAVIGATION APPARATUS FOR A VEHICLE AND ITS INFORMATION COMMUNICATION METHOD, COMPUTER PROGRAM PRODUCT, AND COMPUTER-READABLE STORAGE MEDIUM

(75) Inventors: Hiroshi Ohmura; Masao Ushio; Kouji Hosoda; Shigefumi Hirabayashi, all of Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/834,761

(22) Filed: Apr. 16, 2001

(65) Prior Publication Data

US 2001/0052861 A1 Dec. 20, 2001

(30) Foreign Application Priority Data

Apr. 18, 2000 (JP) ........................................ 2000-116828
Apr. 18, 2000 (JP) ........................................ 2000-116829

(51) Int. Cl.[7] ................................................ G08G 1/00
(52) U.S. Cl. ........................ 340/901; 340/988; 340/989; 340/990; 340/992; 340/995
(58) Field of Search ................................ 340/901, 904, 340/905, 988, 989, 990, 992, 995, 991, 993; 701/200, 207, 208, 211, 212, 223

(56) References Cited

U.S. PATENT DOCUMENTS

| 6,002,345 | A | | 12/1999 | Ohmura et al. | ............. | 340/903 |
|---|---|---|---|---|---|---|
| 6,064,398 | A | * | 5/2000 | Ellenby et al. | ............. | 345/435 |
| 6,091,956 | A | * | 7/2000 | Hollenberg | ................ | 455/456 |
| 6,133,853 | A | * | 10/2000 | Obradovich et al. | ........ | 340/905 |
| 6,182,010 | B1 | * | 1/2001 | Berstis | ..................... | 701/211 |
| 6,385,536 | B2 | * | 5/2002 | Kimura | ..................... | 701/209 |

FOREIGN PATENT DOCUMENTS

JP          10-105897          4/1998

* cited by examiner

Primary Examiner—Daniel J. Wu
Assistant Examiner—Toan Pham

(57) ABSTRACT

A navigation unit 1 sends map image information representing a map image of an area around a current position of an automobile in which the unit 1 is installed to a communication apparatus 9 with which the unit 1 is communicating, if the communication apparatus 9 does not have geographical data. The map image information includes information such as a symbol image that allows the current position of the navigation unit 1 to be identified. The data format of the map image information is a data format that allows the information to be reproduced in an ordinary personal computer.

52 Claims, 21 Drawing Sheets

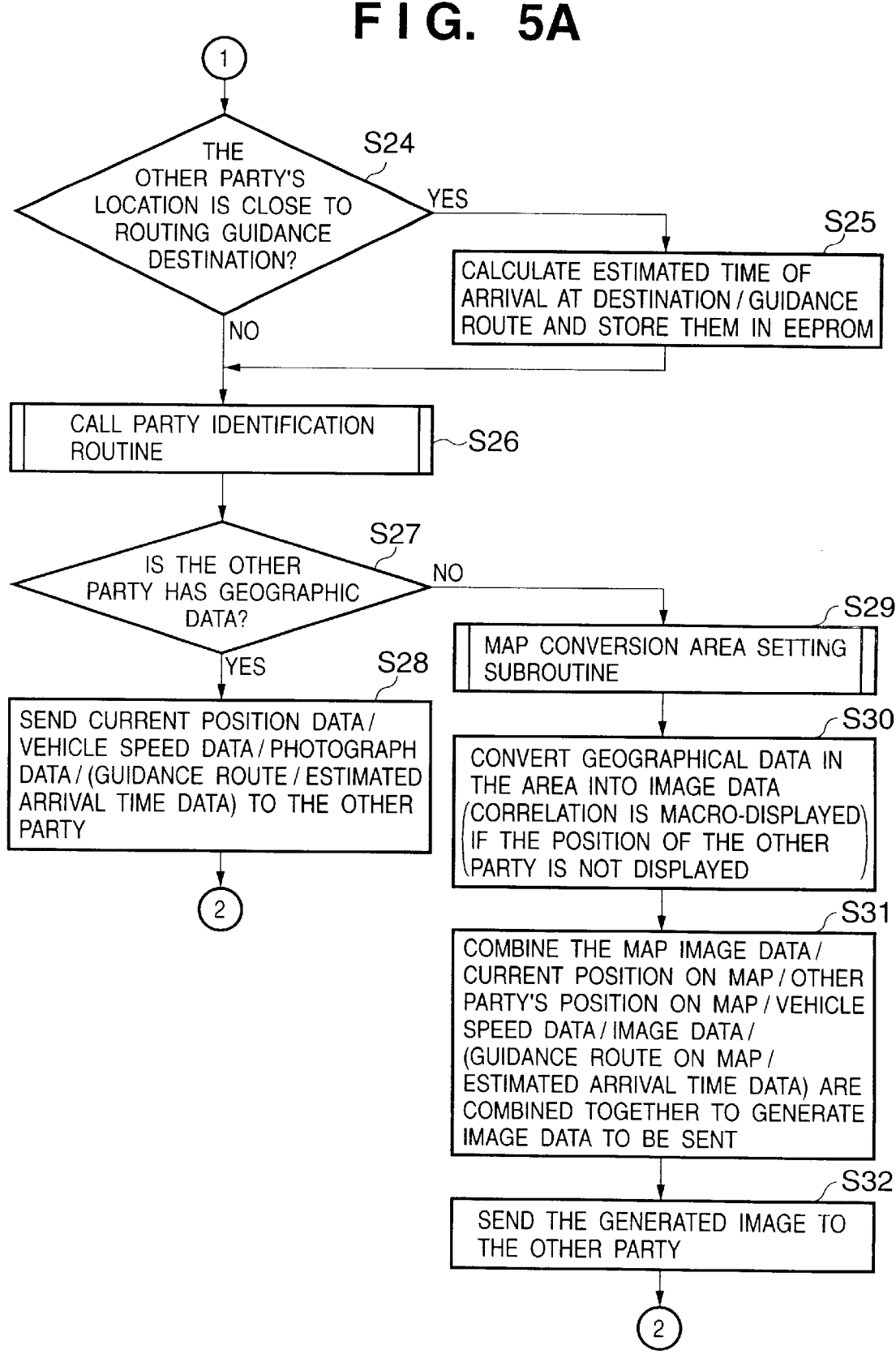

AREA 5

COMMUNICATION APPARATUS AND ITS CURRENT POSITION COMMUNICATION METHOD, NAVIGATION APPARATUS FOR A VEHICLE AND ITS INFORMATION COMMUNICATION METHOD, COMPUTER PROGRAM PRODUCT, AND COMPUTER-READABLE STORAGE MEDIUM

FIELD OF THE INVENTION

The present invention relates to the field of a communication apparatus and navigation apparatus for a vehicle suitable for installation in a movable body such as an automobile.

BACKGROUND OF THE INVENTION

Conventionally, a navigation apparatus for guiding a driver through a route to his/her destination has been widely used in automobiles, which are the typical movable bodies.

In recent years, navigation apparatuses having communication capability have been proposed. Examples of such navigation apparatuses having communication capability include, for example, a navigation apparatus proposed in Japanese Patent Laid-Open No. 10-105897 and the corresponding U.S. patent application No. U.S. Pat. No. 6,002,345, that displays, based on geographical information stored on a storage medium such as a CD and DVD contained in the automobile, a map containing a symbol image corresponding to position information and the content of a message received when it receives the position information representing the current position of another vehicle and the message information during displaying map image on its display.

The prior-art navigation apparatus having communication capability can display the map image containing the symbol image of the other vehicle by using the position information received from the other vehicle because the own vehicle contains a large amount of (comprehensive) geographical information for guiding or other processing.

Therefore, if a typical personal computer without geographical information obtained position information indicating the current position of such a movable body from the movable body, the personal computer would not be able to display operator-identifiable current position information together with the map image of its surrounding area.

In particular, because geographical information contained in a typical navigation apparatus is based on information representing coordinates in a given coordinate system, an external apparatus without geographical information conforming the same specifications cannot display map image perceivable to an operator on its display even if it obtains the coordinate information.

Today, image information on a photograph shot by a digital camera can be easily sent and received and a photo image indicating remote conditions can be easily obtained by a typical personal computer. However, because the personal computer does not include the capability of displaying a map image based on geographical information as described above, the position of the sender of the photograph information cannot be visually identified.

In addition, the above-described prior-art navigation apparatus having communication capability can exchange position and message information with only a navigation apparatus having the same communication capability and cannot send a traveled path or an image shot in the past.

Therefore, it is difficult for a person traveling by a vehicle with the above-described navigation apparatus on a trip to communicate circumstances during the travel to another person who does not have a navigation apparatus with the same capability.

SUMMARY OF THE INVENTION

The present invention has been propose to solve the conventional problem, and has a first object to provide a communication apparatus for sending photograph information, image information indicating a current position of the apparatus and its surrounding area to an external communication apparatus, current position communication method, computer program product, and computer-readable storage medium.

In addition to the first object, it is a second object of the present invention to provide a navigation apparatus for a vehicle for sending a path traveled by the own vehicle or photographic information concerning the own vehicle and its information communication method, computer program product, and computer-readable storage medium.

To achieve the above-mentioned first object, the present invention provides a communication apparatus installed in a movable body, for example, characterized-by the following configuration.

That is, a communication apparatus (1) installed in a movable body, for example, for communicating with an external communication apparatus by radio communication is characterized by comprising: interface means (11, 12) allowing for inputting photograph information; acquisition means (11) for acquiring geographical information (12) representing area around a current position based on position information representing the current position; image processing means (11) for generating, based on position information representing the current position and geographical information representing the area acquired by said acquisition means, map image information representing the map image of the area containing a symbol image allowing the current position to be identified and combining the map image information and the photograph information input through said interface means into a single piece of image information; and communication means (3) for sending the image information combined by the image processing means to a predetermined external communication apparatus (9).

The communication apparatus described above allows an information processing apparatus that is connected to an external communication apparatus and does not have geographical information to display a photograph image and a map image representing the current position of the movable body and the area around the position on a display according to image information received from the communication apparatus installed in the movable body, for example.

In a preferred embodiment, the position information representing the current position and the geographical information representing the area are preferably coordinate information representing coordinates in a predetermined coordinate system, the coordinate information is preferably pre-associated with attribute information about a position corresponding to the coordinate information on a position-by-position basis, and the image processing means preferably converts the attribute information pre-associated with the coordinate information representing the current position and the area into color information pre-set for each type of the attribute information to generate the map image information.

This allows a map image substantially the same as a map image that can be displayed on the own vehicle to be displayed on the image processing apparatus that is connected to the external communication apparatus and does not have geographical information.

In addition, it is preferable that the image processing means generates a simplified map image of the area containing the symbol image without converting an attribute represented by predetermined attribute information of the attribute information into the color information recognizable to an operator when generating the map image information.

This can reduce the amount of information to be transmitted.

Furthermore, preferably the acquisition means acquires position information representing the location of the predetermined external communication apparatus and, based on the position information and the position information representing the current position, acquires geographical information representing an area including the current position and the location of the predetermined external communication apparatus; and the image processing means generates, based on the position information representing the current position and the location and the geographical information representing the area, map image information representing the map image of the area including a symbol image allowing the current position and the location to be identified and combines the map image information and the input photograph information into a single piece of image information.

This allows the relation between the current position of the own vehicle and the information processing apparatus attached to the external communication apparatus to be displayed on the map image, improving convenience.

Preferably, route guidance means (11, 13) is provided for calculating a guidance route to a desired destination and performing route guidance to the destination, and the image processing means generates the map image information in a manner that a partial image corresponding to the guidance route can be identified in the map image of the area including the symbol image if the location of the predetermined external communication apparatus is set as the destination for said route guidance means.

This allows a path traveled by the movable body on which the apparatus is installed to be displayed identifiably on the information processing apparatus attached to the external communication apparatus, improving convenience.

Furthermore, it is preferable that the image processing means further combines image information about a character pattern representing an estimated time of arrival at the destination calculated by the route guidance means or the traveling speed of the vehicle thereof with the map image information.

This allows the estimated arrival time of the movable body on which the apparatus is installed to be displayed identifiably on the information processing apparatus attached to the external communication apparatus, improving convenience.

In a preferred embodiment, the image processing means comprises selection means for selecting a first mode for sending the position information representing the current position or a second mode for sending the image information, depending on the result of sending or receiving predetermined communication information to or from the external communication apparatus.

This can minimize the amount of information sent from the apparatus.

It is preferable that the route guidance means displays the position of a parking lot on the display or performing route guidance to the parking lot based on position information representing the location of the parking lot when the communication means receives the position information in response to a predetermined operation.

Thus, when the apparatus is mounted on a vehicle such as an automobile, time and effort for searching for a parking lot where the vehicle can be parked can be saved by, for example, obtaining from an information processing apparatus connected an external communication apparatus the position information about the parking lot near the location of the information processing apparatus, thereby improving convenience.

To achieve the second object in addition to the first object described above, a navigation apparatus for a vehicle, as a communication apparatus installed in a vehicle which is a typical movable body, according to the present invention is characterized by the following configuration.

That is, a navigation apparatus for a vehicle (1) comprising current position detection means (13) for detecting the current position of the navigation apparatus for a vehicle (1) itself and communication control means (3, 11) for sending position information representing the detected current position to an external communication apparatus is characterized in that: the navigation apparatus for a vehicle (1) comprises interface means (11, 21) allowing for inputting photograph information; the current position detection means (13) comprises storage means (14) for storing the current position information representing the detected current position at a plurality of positions in chronological order to hold a past traveled path; and the communication control means sends the position information representing the current position to a predetermined external communication apparatus (9) along with the position information about the plurality of positions read from the storage means in chronological order or photograph information input through the interface means.

This allows the path traveled by the own vehicle or its photograph information to be sent to the external communication apparatus to inform the operator of the external communication apparatus as to the progress of the own vehicle visually and efficiently.

In a preferred embodiment, the communication control means sends information about shooting circumstance (shooting site, time, direction, and other information) associated with the photograph information. This allows more detailed information to be provided.

Preferably, the navigation apparatus for a vehicle further comprises route guidance means (11) for calculating a guidance route to a desired destination from the current position detected by the current position detection means and performing route guidance to the destination, the navigation apparatus for a vehicle being characterized in that the communication control means sends guidance route information representing the guidance route.

Thus, the route the own vehicle is traveling can be indicated to the operator of the external communication apparatus and the operator can easily guide the driver of the vehicle.

The above-described first object can also be achieved by a current position communication method, a program code providing instructions for implementing the operation of the communication apparatus, and a computer-readable storage medium on which the program code is stored.

The above-described second object can also be achieved by an information communication method for the navigation apparatus for a vehicle comprising the above-described configurations, a program code providing instructions for implementing the operation of the navigation apparatus for a vehicle, and a computer-readable storage medium on which the program code is stored.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are flowcharts showing a communication process in the navigation unit 1 according to the first embodiment;

DETAILED DESCRIPTION OF THE PREFERRED EMBODIMENTS

Preferred embodiments of the present invention will now be described in detail in accordance with the accompanying drawings.

Embodiments in which the present invention is applied to a navigation unit installed in an automobile (vehicle), which is a typical movable body, will be described below in detail with reference to the drawings.

[First Embodiment]

First, the device configuration of the navigation unit according to a first embodiment and the entire configuration of a communication system consisting of the navigation unit and external communication devices will be described with reference to FIGS. 1 and 2.

Figure 1:
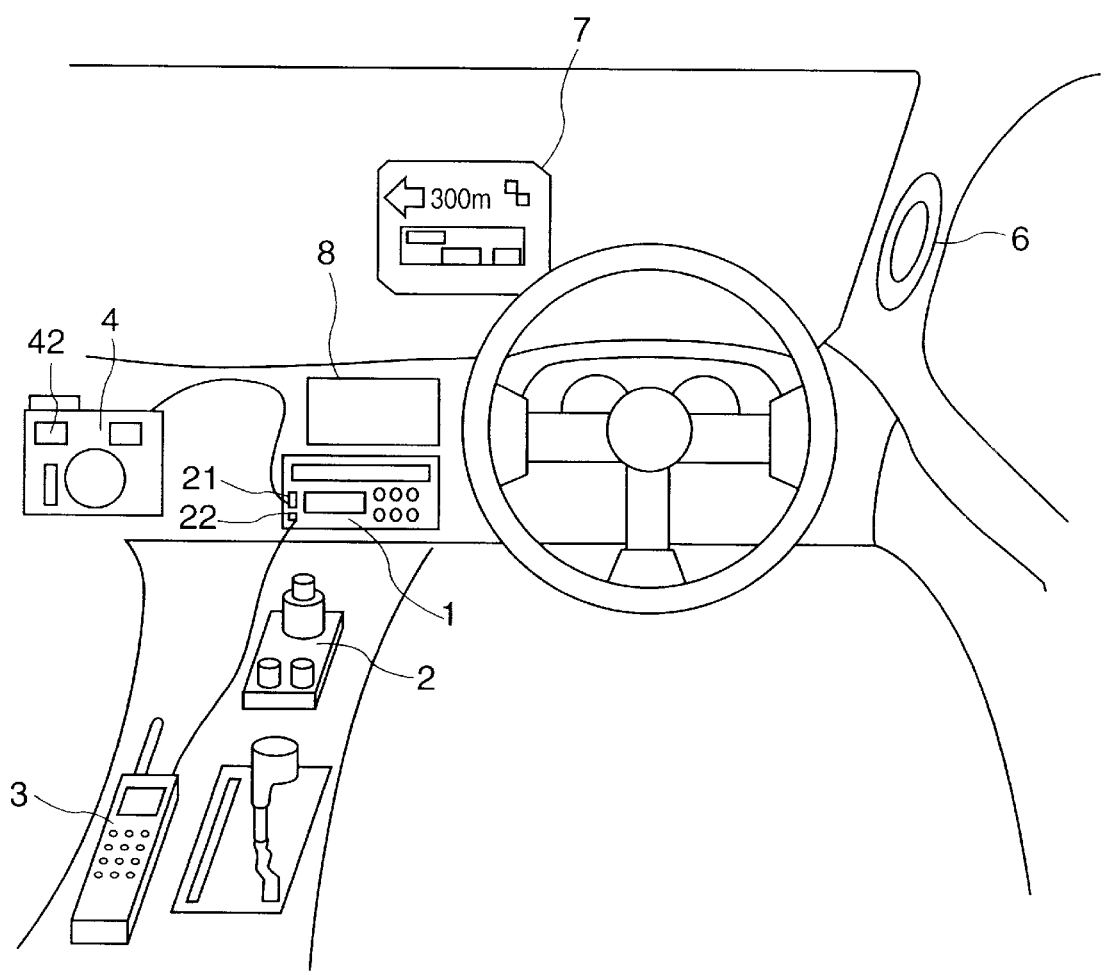
FIG. 1 is a diagram illustrating an arrangement of equipment around the driver's seat of an automobile in which a navigation unit according to a first embodiment of the present invention is installed.

FIG. 1 is a diagram illustrating an arrangement of equipment around the driver's seat of an automobile in which a navigation unit according to the first embodiment of the present invention is installed.

In FIG. 1, reference number 1 indicates the navigation unit, which may be embedded in the center console within a vehicle with its control panel being exposed, for example. Reference number 2 indicates a navigation manipulation module for performing various manipulations of the navigation unit 1 and provided in the vicinity of a range shift lever, for example. Provided in the navigation manipulation module 2 is a manipulation stick into which a switch for manipulating navigation functions, a switch for capturing photograph information (image information) through a digital camera 4, and a switch for sending and receiving data to and from an external device through a mobile phone 3 are integrated. An operator performs manipulations of the navigation unit 1 with reference to a display screen such as a display 8.

While the digital camera 4 in FIG. 1 comprises a compass 42 that can detect a shooting direction, the compass 42 is used in a second embodiment, which will be described later.

Reference number 3 indicates the mobile phone, which is detachably attached to an interface (connector) 22 in the navigation unit 1.

Reference number 4 indicates the digital camera, which is detachably attached to an interface (connector) 21 in the navigation unit 1 and does not need to be attached if no photograph data is sent to external communication devices.

It the digital camera 4 and the navigation unit 1 send photograph data over wireless communication (radio wave, infrared, or other communications), the interface 21 may be a sending/receiving module for accomplishing the wireless communication.

Reference number 6 indicates a loudspeaker/microphone unit which includes a microphone through which the driver inputs voice data into the navigation unit 1 and a loudspeaker through which an audio signal output from the navigation unit 1 is output, and is used for a communication by the mobile phone 3 or a guidance by an audio output. The loudspeaker/microphone unit 6 is embedded in an A-pillar of the vehicle, for example.

Reference number 7 indicates a head-up-display (HUD) for displaying various items of information such as route guidance information and the speed of the vehicle provided by the navigation unit 1. Reference number 8 indicates a display provided in the dashboard for displaying information similar to that on the head-up-display 7 and more detailed monitor information such as operating conditions of the vehicle.

Figure 2:
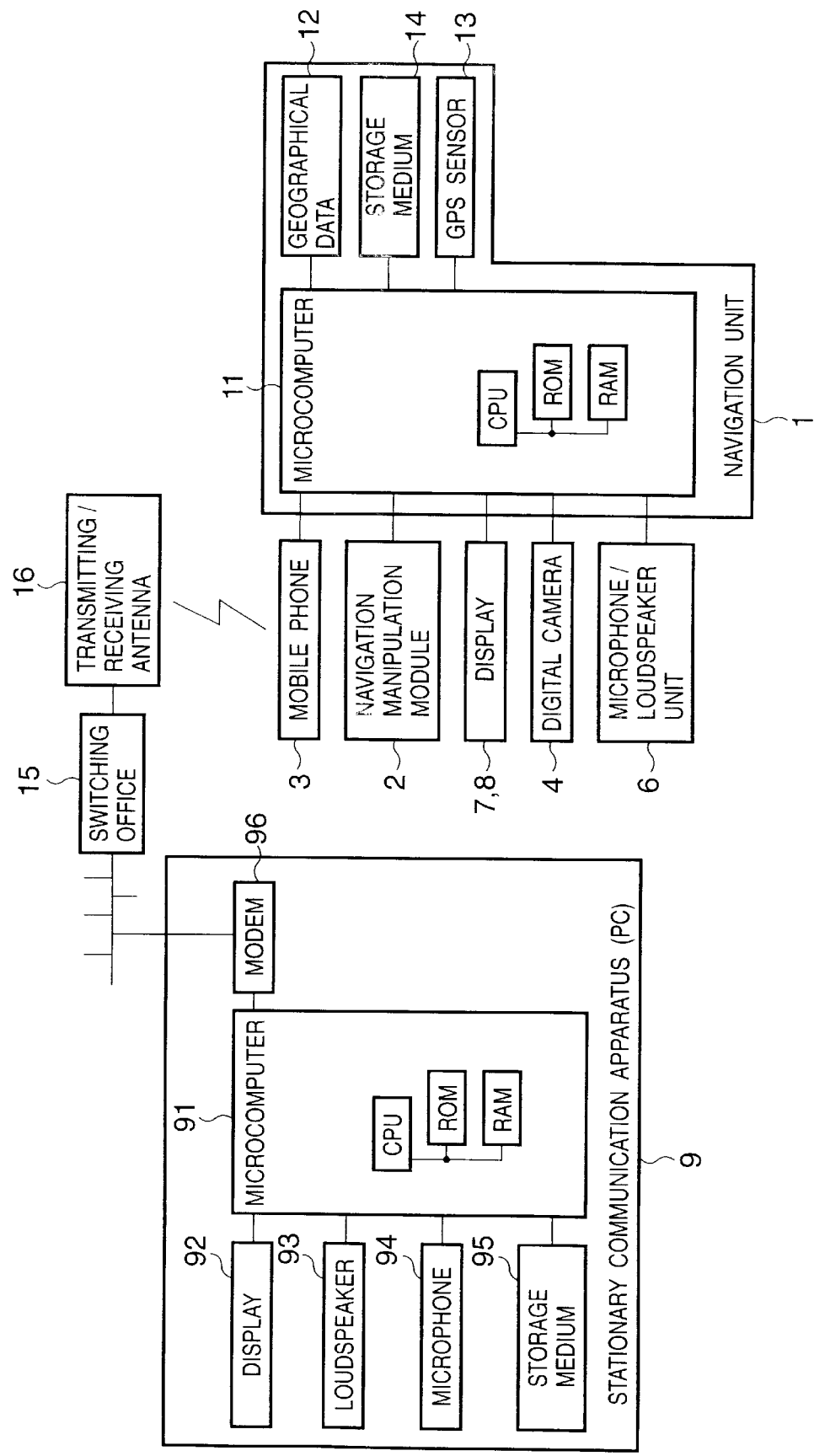
FIG. 2 is a diagram showing a configuration of the entire communication system and a general configuration of the navigation unit and an external communication devices according to the first embodiment.

FIG. 2 is a diagram showing the configuration of the entire communication system and the general configuration of the navigation unit and an external communication device according to the first embodiment.

<Navigation Unit 1>

Connected to the navigation unit 1 shown in FIG. 2 are the navigation manipulation module 2, mobile phone 3, digital camera 4, microphone/loudspeaker unit 6, HUD (Head Up Display) 7, and display 8 as described above through interfaces, which are not shown. A microcomputer 11 in the navigation unit 1 executes a control program stored in storage such as ROM to perform processes such as the detection of the current position and route guidance to a desired destination in a general manner based on geographical data 12 and sensor output signals from a GPS (Global Positioning System) 13 and a gyro, as well as communication with the stationary communication apparatus 9, which is an external communication apparatus (these processes will be described in detail later).

Reference number 14 indicates a storage medium, such as EEPROM, for storing information such as photograph data obtained through the digital camera 4 and shooting data and routing guidance data calculated by the microcomputer 11.

The geographical data 12 includes position information indicating routes such as roads, railroads, rivers, place names, stores, and houses, and data read from a storage medium such as a DVD storing various items of information such as telephone numbers, included in a drive unit, such as a DVD-RAM drive, which is not shown.

In addition, the geographical data 12 has a data format conforming predetermined specifications.

The above-mentioned position information consists of coordinate information (latitude and longitude data) representing coordinates in a given coordinate system for implementing typical navigation processes such as map matching based on GPS signals. The coordinate information is pre-associated with attribute information (information for identifying a road and its rank, a railroad, river, store, and the like) concerning each point corresponding to the coordinate information in order to display a map image perceivable by the driver (operator) on the display 8.

<Communication Apparatus 9>

The communication apparatus 9 in FIG. 2 comprises a microcomputer 91, a display 92, a loudspeaker 93, a microphone 94, a storage (storage medium) 95 such as a hard disk, and a modem (or terminal adapter) 96. It is assumed that the communication apparatus 9 in the present embodiment is a information device, such as home personal computer and the so-called videophone, having communication capability that enables two-way communication of voice and data with the mobile phone 3.

The microcomputer 91 executes a control program stored in the ROM or storage device 95 to establish a communication line to a public network according to a typical procedure through the modem 96 and performs communication (which will be detailed later) with the navigation unit 1.

While the communication apparatus 9 will be described as a stationary communication apparatus for the simplicity of the explanation of features of the present embodiment, it is not limited to the stationary apparatus. Instead, it may be a portable Personal Digital Assistants (PDA) that has the capability of detecting or the current position of the apparatus itself or obtaining it from an external source and the communication capability for enabling two-way communication of voice and data with the mobile phone 3 attached to the navigation unit 1.

The mobile phone 3 of the navigation unit 1 and the communication apparatus 9 with the above-described configuration establish a one-to-one communication line with each other using a public network through a switching office 15 and its sending/receiving antenna 16. The public network used in the present embodiment may be an analog or digital telephone network, or a network that enables packet transfer communication.

[Data Communication Process]

A data communication process, which is included in the operation control process in the navigation unit 1 and communication apparatus 9 described above, will be outlined below.

The navigation unit 1 sends map image information representing a map image of an area around the current position of an automobile (movable body) in which the unit is installed to the communication apparatus 9. The map image information includes information about a symbol image that allows the current position of the navigation unit 1 to be identified. The data format of the map image information may be chosen from data formats, such as the so-called bitmap, JPEG, and GIF, that can be readily reproduced by a typical personal computer, depending on conditions such as a data transfer rate of the communication line used and the fineness of map images to be displayed on the communication apparatus 9.

According to the present embodiment, the communication apparatus 9 can readily display received map image information on the display 92 without the need for including a display processing module (software or hardware) for processing geographical information and map images based on that geographical information conforming the same specifications as those for the geographical data 12 in the navigation unit 1. Thus, the operator of the communication apparatus 9 can identify the position of the vehicle in which the navigation unit 1 is installed by viewing the map image displayed (the map image information to be sent to the communication apparatus 9 in the process described later includes photograph data and image data representing character patterns in order to enhance convenience).

The operation control process in the navigation unit 1 and the communication apparatus 9 will be described below in detail. The navigation unit 1 in the present embodiment is powered from a battery in the vehicle in which the unit is installed and has a configuration that allows the communication process described below to be executed even if the ignition system is turned off.

<Operation Control Process in the Navigation Unit 1>

Figure 3:
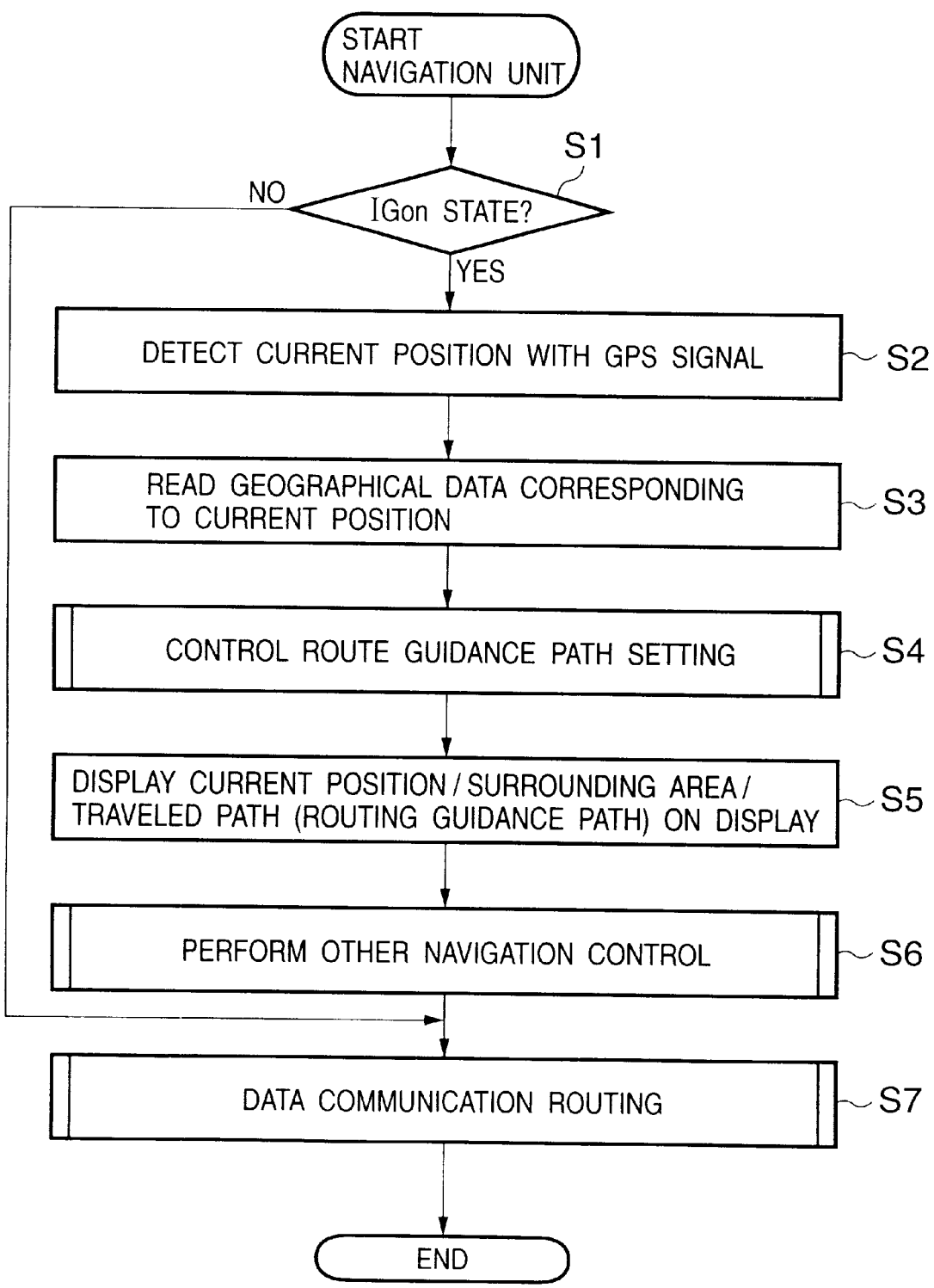
FIG. 3 is a flowchart showing an operation control process in the navigation unit 1 according to the first embodiment.

FIG. 3 is a flowchart showing the operation control process in the navigation unit 1 in the first embodiment and illustrating a software procedure executed by the microcomputer 11.

Steps S1, S2 in FIG. 3: It is determined whether the ignition switch (not shown) of the vehicle in which the navigation 1 is installed is turned on or not (step S1). If the determination is NO (ignition: off), the process proceeds to step S7. If the determination is YES (ignition: on), the current position (coordinate information consisting of latitude and longitude data) of the vehicle is calculated by using a commonly used method based on an output signal from a GPS sensor 13 (step S2).

Steps S3, S4: Geographical information about the area around the current position is read from the geographical data 12 based on the coordinate information of the current position calculated at step S2 (step S3) and a guidance route to a desired destination specified is set (step S4).

Steps S5, S6: A map image containing the current position, surrounding area, traveled path (guidance route) and other information is displayed on the display 8 on a desired scale set by the driver by using the geographical information read at step S3 and following a procedure as with a typical navigation apparatus (step S5). Navigation such as routing guidance using the microphone/loudspeaker unit 6 and HUD 7 is performed (step S6).

Step S7: A data communication process, which is a feature of the present invention, is performed.

The process from step S1 to S6 described above is performed with techniques commonly used and the detailed description of which is omitted herein.

Figure 4:
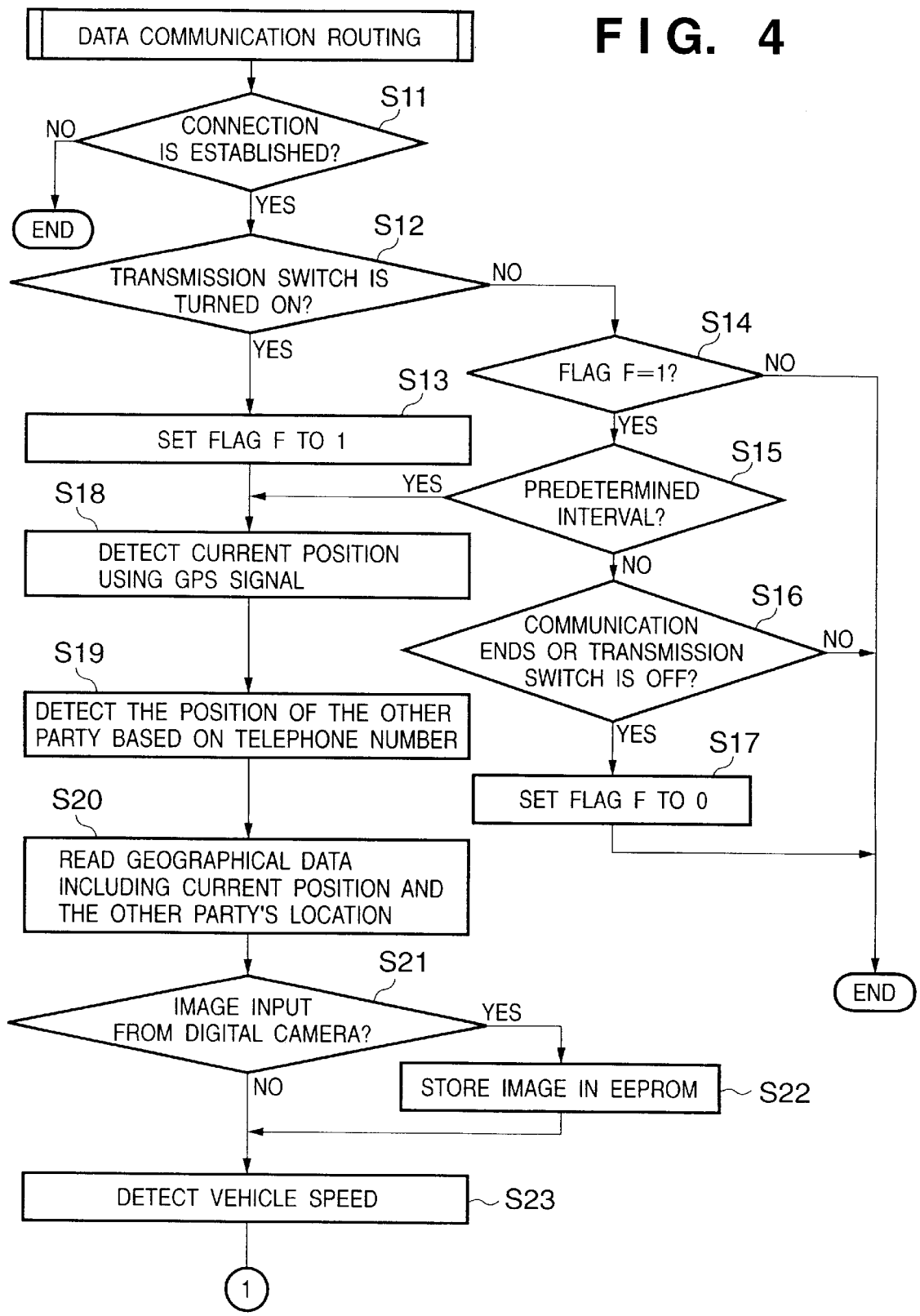
FIG. 4 is a flowchart showing a communication process in the navigation unit 1 according to the first embodiment.
Figure 5B:
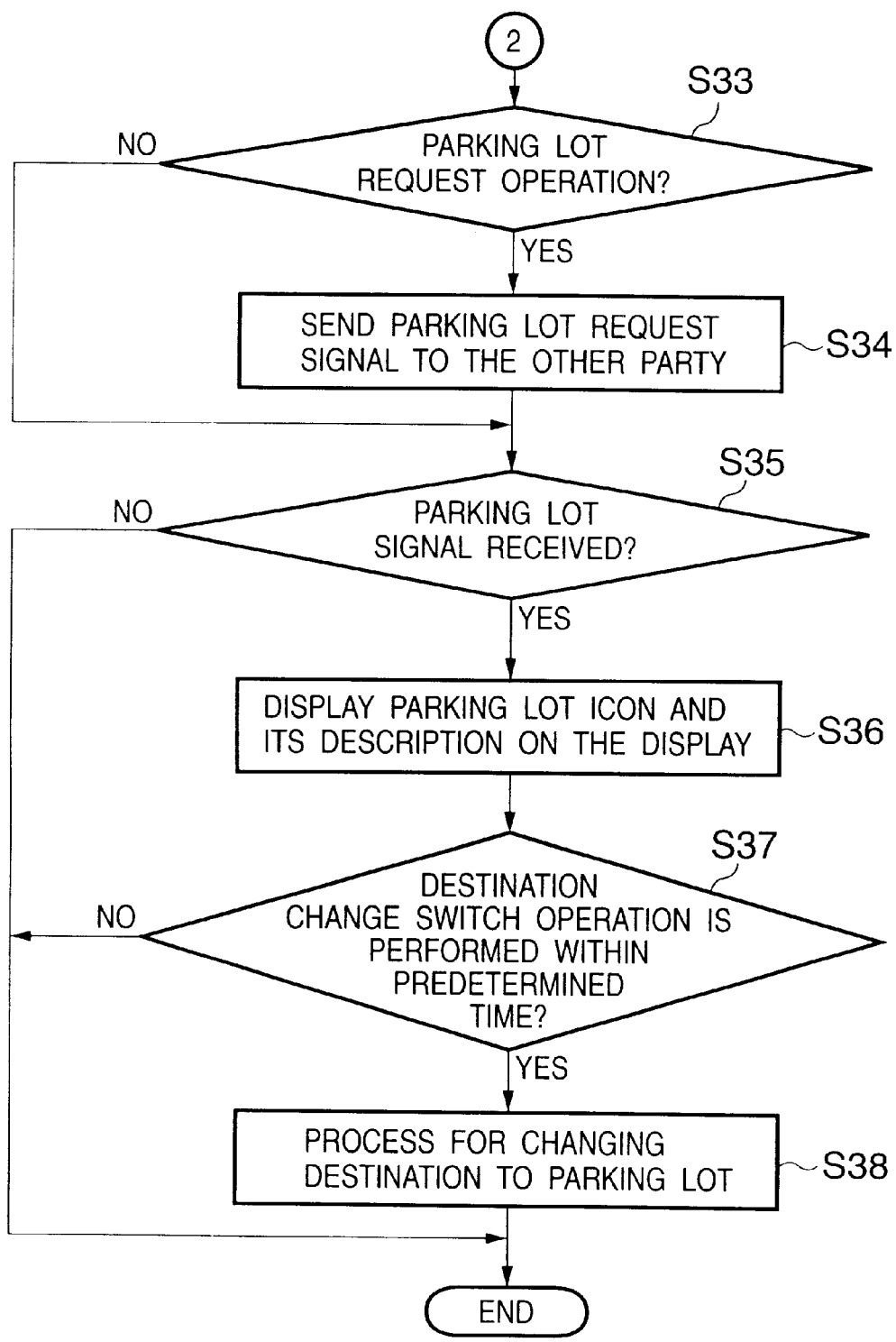

FIGS. 4, 5A, and 5B are flowcharts of a communication process performed in the navigation unit 1 according to the first embodiment and show the details of step S7 in FIG. 3.

Steps S11 to S13 in the flowcharts: It is determined whether or not the mobile phone 3 is in communication with an external communication apparatus (that is, a connection with an external communication apparatus is established) (step S11). If the determination is NO (no connection is established), the process will end (that is, the process returns to step S1 in the flowchart in FIG. 3). If the determination at step S11 is YES (connection is established), it is determined whether a predetermined transmission switch for starting data transmission to the other party to the communication is turned on or not by the operation of the navigation manipulation module 2 (step S12). If the determination at step S12 is YES (the switch is turned on), an internal processing flag F, indicating whether data communication process is being executed or not is set to "1" ("in execution") (step S13). If the determination is NO (the switch is not turned on), the process proceeds to step S14.

Steps 14, 15: It is determined whether internal processing flag F is set to 1 or not (step S14). If the determination is NO (F=0: not in execution), the process is terminated. If the determination is YES (F=1), it is determined whether or not a predetermined time interval has elapsed (step S15). If the determination is NO (the predetermined time interval has not elapsed), the process proceeds to step S16. If the determination is YES (the predetermined time interval has elapsed), the process proceeds to step S18.

Steps S16, S17: It is determined whether or not the communication with the other party with which communication is performed is terminated by the operation of the navigation manipulation module 2, or whether or not a predetermined transmission termination switch is turned on (step S16). If the determination is YES (the switch is turned on), internal processing flag F is set to "0" (step S17). If the determination is NO (the switch is not turned on), the process ends.

Steps S18 to S20: The current position (coordinate information consisting of latitude and longitude data) of the own vehicle is calculated by using a commonly used technology based on an output signal from the GPS sensor 13 (step S18: the coordinates calculated at step S2 in FIG. 3 described above may be used) and the current position of the other party with whom the communication is being performed is detected by referencing the geographical data 12 using the telephone number of the party (step S19). Then coordinate information including the current position of the own vehicle and the location of the other party is read from the geographical data 12 (step S20).

Steps S21, S22: It is determined whether the input operation of photograph data from the digital camera 4 is performed or not (step S21). If the determination is No (the operation is not performed), the process proceeds to step S23. If the determination is YES (the operation;is performed), the input photograph data is stored in memory (storage medium) 14 such as EEPROM (step S22).

Step S23: The speed of the own vehicle is detected based on an output signal from a vehicle speed sensor, which is not shown.

Steps S24, S25: It is determined whether or not the location of the other party is in the vicinity of (within a predetermined distance from) the destination of the guidance route that is currently set (step S24). If the determination is NO (outside of the predetermined distance), the process proceeds to step S26. If the determination is YES (within the predetermined distance), estimate time of arrival at the destination and the guidance route to the destination is calculated based on the vehicle speed obtained at step S23 and other information and the information thus determined is stored in the memory (storage medium) 14 such as EEPROM (step S25).

Steps S26, S27: A call party identification routine, which will be described later, is executed (step S26). The call party identification routine executed at step S26 is a routine for determining whether or not the communication apparatus of the other party with which the communication is currently establish is an apparatus that has geographical data conforming the same specifications as those for the navigation unit 1 and can display a map image according to a procedure similar to that for the navigation unit 1.

Depending on the result of the process at step S26, the process proceeds from step S27 to step S28 if the communication apparatus of the other party has the geographical data, or to step S29 if it does not has the geographical data.

The call party identification routine will be described below.

Figure 6:
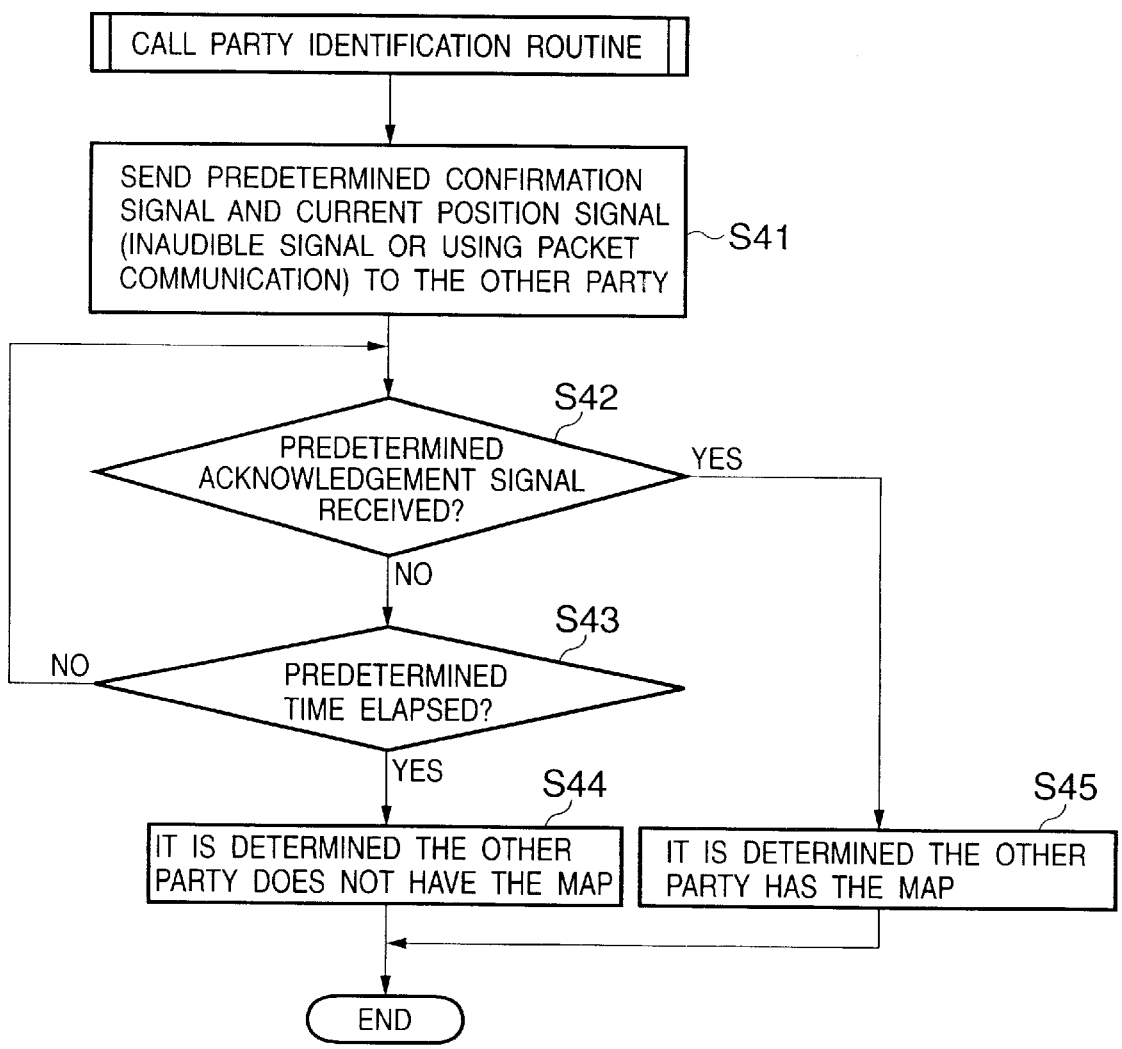
FIG. 6 is a flowchart showing a call party identification routine performed by the navigation unit 1 according to the first embodiment.

FIG. 6 is a flowchart showing the call party identification routine performed by the navigation unit 1 according to the first embodiment and showing the details of step S26 in FIG. 5A.

Steps S41, S42 in FIG. 4: A predetermined confirmation signal and a signal containing coordinate information representing the current position of the own car are sent to the communication apparatus of the other party through the communication line currently established (step S41), then it is determined whether or not a predetermined acknowledgement signal is received from the communication apparatus of the other party in response to these signals (step S42).

Step S45: Because it is determined at step S42 that the predetermined acknowledgement signal is received from the communication apparatus of the other party, it is determined that the communication apparatus of the other party has the geographic data conforming the same specification as those for the navigation unit 1

Steps S43, S44: It is determined whether the determination has been repeated for a predetermined period that the predetermined acknowledgement signal from the communication apparatus of the other party is not received (step S43). If the determination is YES (the signal is not received within the predetermined period), it is determined that the communication apparatus of the other party does not have the geographical data conforming the same specifications as those for the navigation unit 1 (step S44).

Returning to the flowcharts in FIGS. 4, 5A, and 5B, the description of the process will be continued below.

Step S28: Because it is determined at step S27 that the communication apparatus of the other party has the geographical data, the communication apparatus of the other party can display a map image perceivable by a human according to a procedure similar to that for the navigation unit 1 based on the geographical data. Therefore, at step S28, the coordinate information representing the current position of the own vehicle obtained at step S18 and the vehicle speed detected at step S23, the coordinate information representing the estimated arrival time and the coordinate information representing the guidance route if they are calculated at step S25, and the photographic data if it is input at step S22, are sent to the communication apparatus of the other party over the communication line currently established.

Steps S29 to S31: Because it is determined at step S27 that the communication apparatus of the other party has neither the geographical data nor the capability of displaying a map image based on the geographical data, map image information in a format, such as the so-called bitmap, JPEG, or GIF, that can be reproduced on a typical personal computer must be sent to the communication apparatus in order for the communication apparatus of the other party to display a map image similar to that displayed on the display 8 of the navigation unit 1.

Therefore, at step S29, a map conversion area setting subroutine is first executed for setting an area of the map image represented by the map image information to be sent. The map conversion area setting subroutine will be described below with reference to FIGS. 7 to 12.

Figure 7:
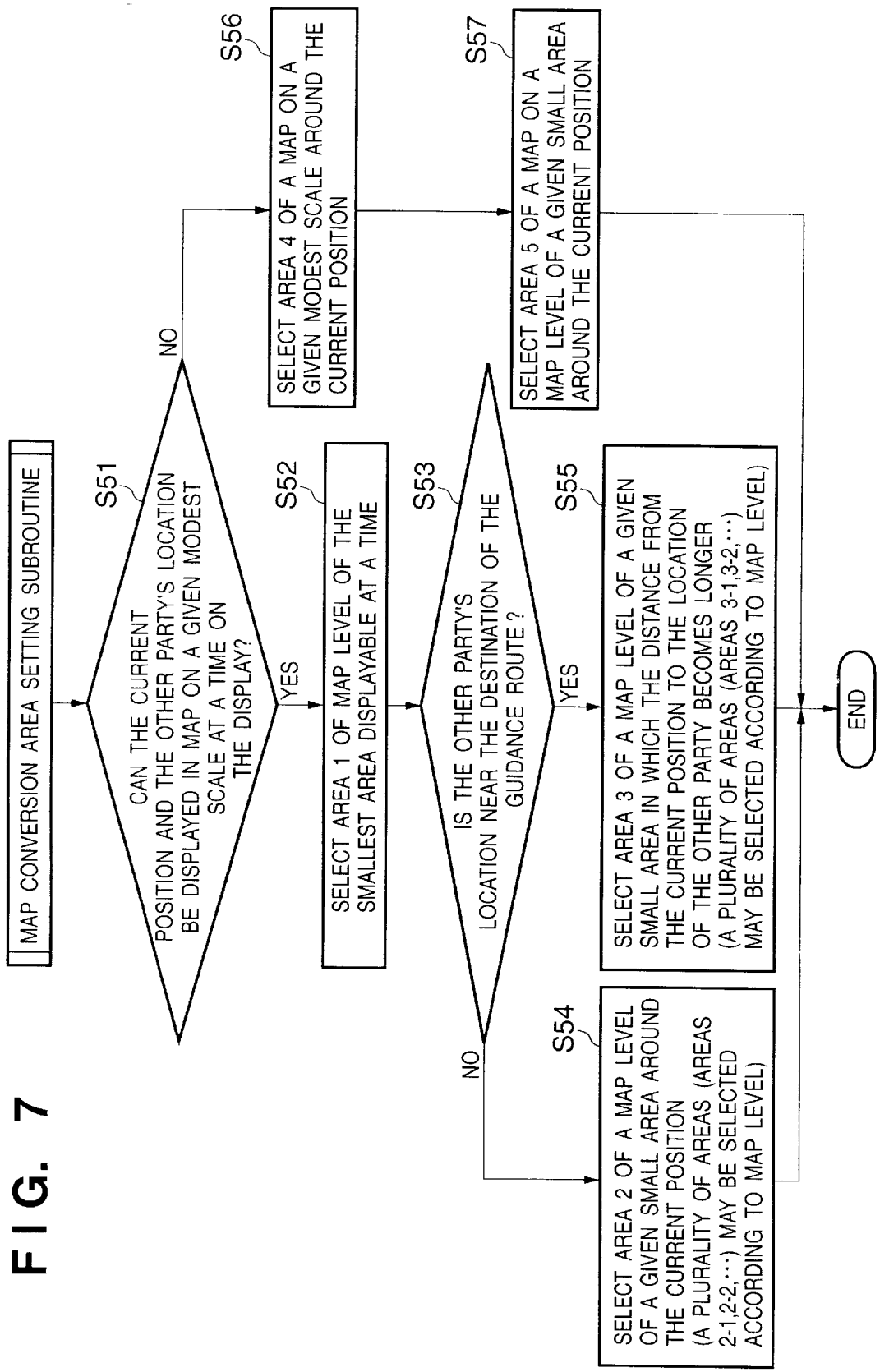
FIG. 7 is a flowchart showing a map conversion area setting subroutine according to the first embodiment.
Figure 8:
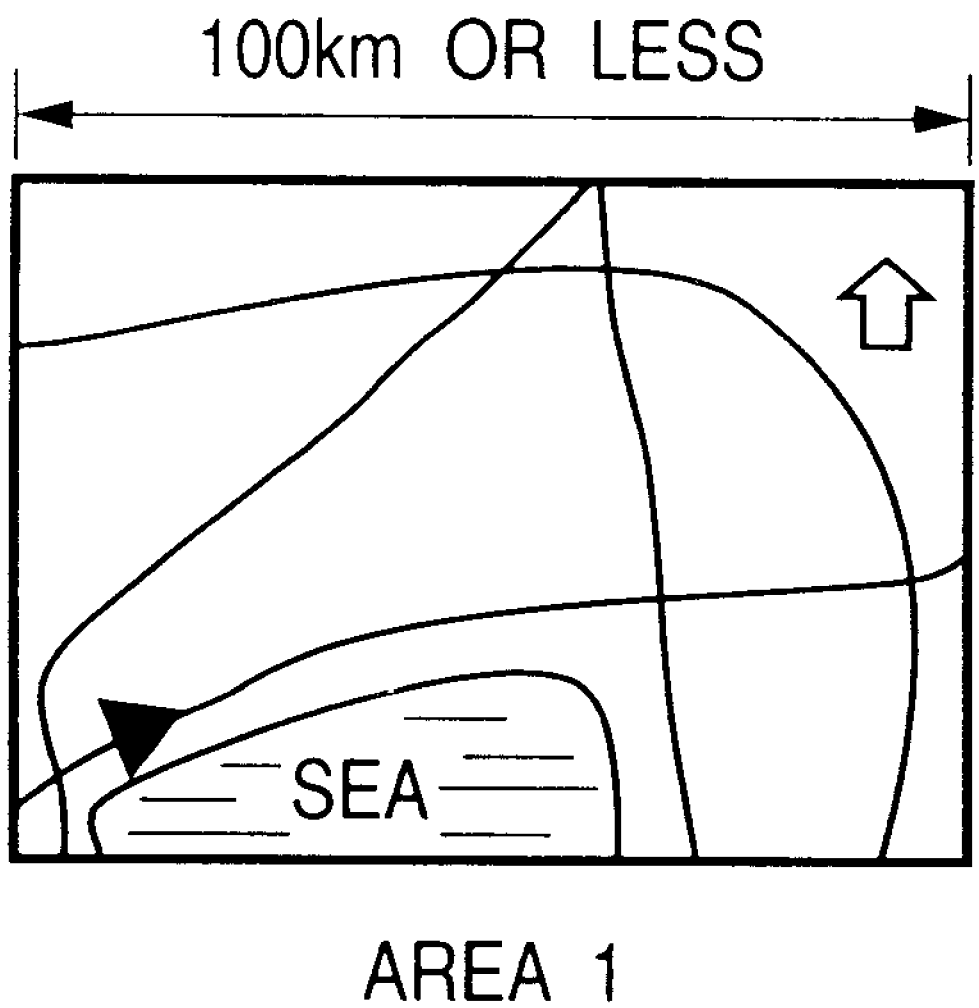
FIG. 8 is a diagram illustrating an area (scale) of map image to be sent.
Figure 9A:
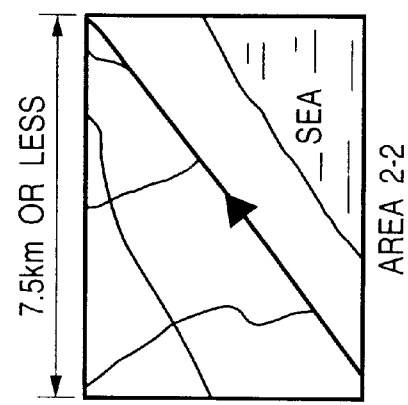
FIGS. 9A, 9B, and 9C are diagrams illustrating areas (scales) of map image to be sent.
Figure 9B:
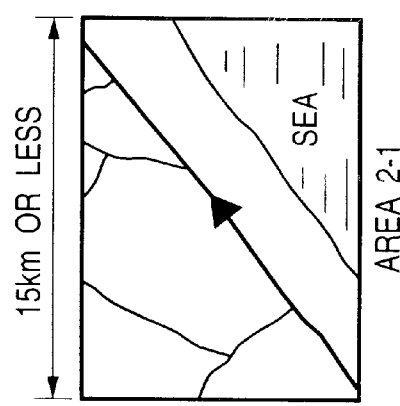
Figure 9C:
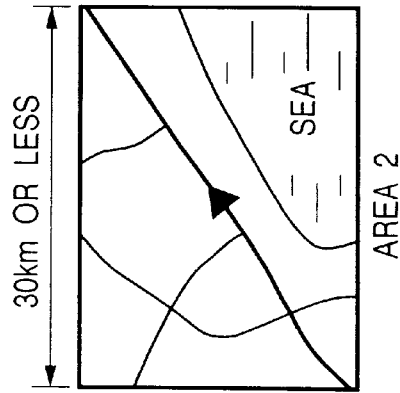
Figure 10C:
FIGS. 10A, 10B, and 10C are diagrams illustrating areas (scales) of map image to be sent.
Figure 10B:
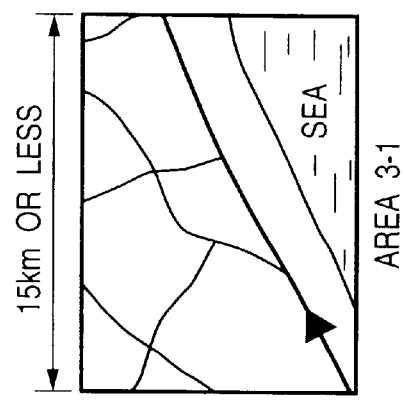
Figure 10A:
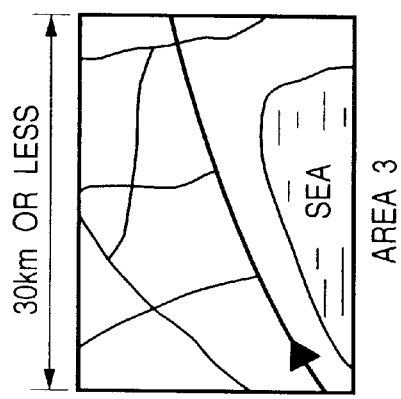
Figure 11:
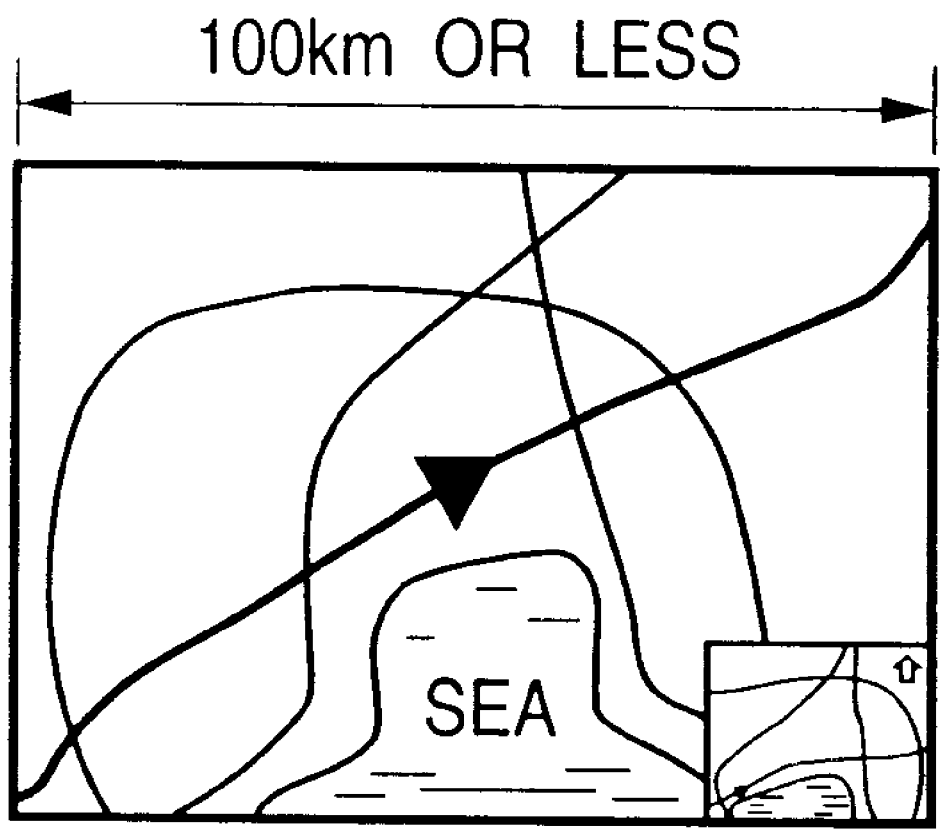
FIG. 11 is a diagram illustrating an area (scale) of map image to be sent.
Figure 12:
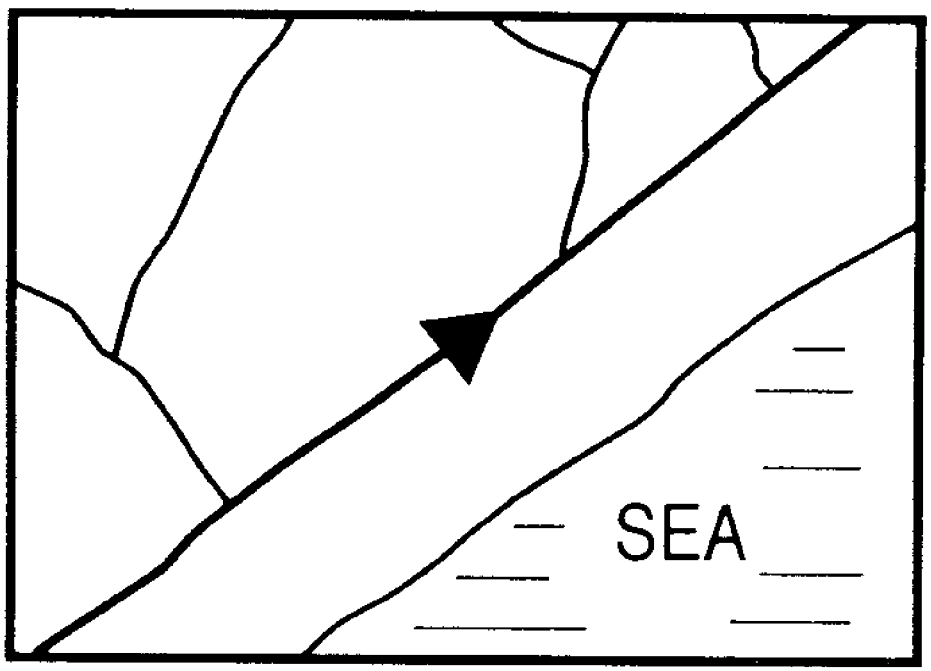
FIG. 12 is a diagram illustrating an area (scale) of map image to be sent.

FIG. 7 is a flowchart of the map conversion area setting subroutine according to the first embodiment and shows the details of step 29 in FIG. 5B.

Step S51 in FIG. 7: It is determined whether a map image on a predetermined moderate scale (for example, 60 Km long×100 Km wide) can include the symbol images of the current position of the own vehicle and the location of the other party, based on the coordinate information about the two positions. If the determination is YES (they can be displayed at a time), the process proceeds to step S52. If the determination is NO (they cannot be displayed at a time), the process proceeds to step S58.

Steps S52, S53: Because it is determined at step S51 that the two positions are displayed at a time, a map level of the smallest area (area 1, see a map image illustrated in FIG. 8) in which they can be displayed at a time is selected (step S52), it is determined whether the location of the other party is in the vicinity of (within a predetermined distance from) the destination of the guidance route currently set (step S53).

Step S54: Because the determination at step S53 is NO (outside of the predetermined distance), a map image on a scale of a predetermined small area (area 2, see a map image illustrated in FIG. 9A) around the current position is selected. The reason why the map image around the current position of the own car is selected is that the location of the other party is far distant from the destination of the guidance route currently set and it is expected to be more convenient to send the map image in a range at a substantially equal distance in all directions from the current position to the other party.

At the step S54, in addition to the map image of the area 2, the scale of area 2-1 or area 2-2 on a higher scale (see map images illustrated in FIGS. 9B and 9C) maybe chosen in order to prepare a map image containing more detailed information for transmission.

Step S56: Because the determination at step S53 is YES (within the predetermined distance), a map image is selected that is on the scale of a map level of a predetermined small area (see a map image illustrated in FIG. 10A) and is in a direction in which the distance from the current position of the own vehicle to the location of the other party becomes longer. The reason why the, map image in the direction in which the distance from the current position of the own vehicle to the location of the other party becomes longer is selected is that it is determined at step S53 that the location of the other party is closer to the destination of the guidance route currently set, and the own vehicle is traveling toward the location of the other party, therefore the map image in the direction in which the distance from the current position of the own vehicle to the location of the other party becomes longer is more convenient for the other party viewing the map image for the purpose of the guidance.

At the step S56, a map image containing more detailed information may be prepared for transmission by choosing, in addition to the map image of area 3, a map image of area 3-1 or 3-2 (see map images illustrated in FIGS. 10B and 10C) on a higher scale.

Steps S58, S59: Because it is determined at step S51 that the two position cannot be displayed at a time, the scale of area 4 (see a map image illustrated in FIG. 11) around the current position, which is a map level of the modest scale, is selected (step S58) and area 5 (see a map image illustrate in FIG. 12) on a higher scale (step S59). When selecting map image on area 4 scale at step S58, a map image on a higher scale is selected in order to display the map image on the scale in which the two positions can be displayed at a time.

That is, in the above-described map conversion area setting subroutine, if a map on the area 1 scale can include the symbol images of the current position of the own vehicle and the location of the other party and the destination of a guidance route currently set is close to the location of the other part, the map image on the area 1 scale and a map image on the area 3 scale are selected as map images to be sent (areas 3-1 and 3-2 may be selected in addition).

Furthermore, if the map image on the area 1 scale can include the symbol images of the current position of the own vehicle and the location of the other party and the destination of the guidance route currently set is distant from the location of the other company, the map image on the area 1 scale and a map image on the area 2 scale are selected as map images to be sent (areas 2-1 and 2-2 may be selected in addition).

If the map image on the area 1 scale cannot contain the symbols of the current position of the own vehicle and the location of the other party, map images on the area 4 scale and the area 5 scale and a map image on a higher scale in which the two positions can be displayed at a time are selected as map images to be sent.

Steps S30, S31: each of the map images of areas and scales set at step S29 as described above (geographical data (coordinate information) within the navigation unit 1) is converted into image data (map image information) in any of the above-mentioned data formats (step S30).

Then, the data on the vehicle speed detected at step S23, the coordinate information representing the current position of the own vehicle obtained at step S18, and the estimated time of arrival and the coordinate information representing the guidance route if they are calculated at step S25 and photograph data if it is input at step. S22, are combined with the image data in the predetermined format representing the map image obtained at step S30 to generate image data (step S31).

As described above, the coordinate information is pre-associated with attribute information (information for identifying a road and its rank, a railroad, river, store, and the like) concerning each point corresponding to the coordinate information in order to display a map image perceivable by the driver (operator) on the display 8. Therefore, the coordinate information can be converted into image data simply by pre-setting color information (for example, white for roads, black for railroads, blue for rivers, and red for guidance route) into which each type of the associated attribute information is to be converted and converting each of the attribute information associated with the coordinate information in a area to be converted into the image data into the color information according to the settings.

If, at step 30, the map images on the area 4 and 5 scales and the map image on a higher scale in which the two positions can be displayed at a time are selected in the map conversion area setting subroutine, that is, the map image does not contain the symbol image including the location of the other party because of the scale of the map image represented by image data to be sent to the other party, image data of a map image with which the map image on the hither scale including the symbol image of the current position of the vehicle and location of the other party is combined is generated in a part (in the lower right corner, for example) of the map image. By displaying this map image (see FIG. 11) on the other party's communication apparatus that received the image, the operator of the communication apparatus can easily recognize the relation between its own location and the current position of the vehicle to which the party is communicating.

If all types of attribute information were converted into color information at step 30, the amount of image data to be sent would become large. Therefore, it is preferable that predetermined items (stores and private houses, for example) of the attribute information are not converted into color information that allows the operator to recognize attributes represented by the items of attribute information and are represented in the background color, green, for example, of the map image is set for them. This allows a smaller amount of simplified map image information to be generated when it is sent as image data in a predetermined compression format.

Step S32: The image data generated at step S31 is sent to the other party's communication apparatus over the communication line currently established.

Steps S33, S34: It is determined whether a predetermined switch operation such as manipulation of the navigation manipulation module 2 for obtaining position information about a parking lot near the location of the other party (step S33). If the determination is YES (the switch operation is performed), a predetermined signal (parking lot request signal) is sent to the other party over the communication line currently established (step S34). If the determination is NO (the switch operation is not performed), the process proceeds to step S35.

Steps S35, S36: It is determined whether a signal including the position information (coordinate information) about the parking lot has been received from the other party's communication apparatus to which the parking lot request signal is sent at step S34 (step S35). If the determination is NO (the signal is not received), the process will end. If the determination is YES (the signal is received), the geographic data 12 is referenced based on the received position information to display on the display 8 a map image on a desired scale set by the driver that contains the symbol image of the parking lot corresponding to the position information (step S36).

Steps S37, S38: It is determined whether or not a predetermined switch operation for changing the destination of the guidance route by manipulating the navigation manipulation module 2 is performed within a predetermined time of the beginning of the display of the map image containing the symbol image of the parking lot at step S36 (step S37). If the determination is No (the switch operation is not performed), the process is terminated. If the determination is YES (the switch operation is performed), the destination of the guidance route provided by the navigation function is changed to the parking lot (step S38), then the process will end.

<Operation Control Process in Communication Apparatus 9>

An operation control process performed in the communication apparatus 9 will be described below. In the following description, a case where the communication apparatus 9 does not have geographical data conforming the same specifications as those for the navigation unit 1 (FIG. 13) and a case where the communication apparatus 9 has such geographical data (FIG. 14) will be described.

Figure 13:
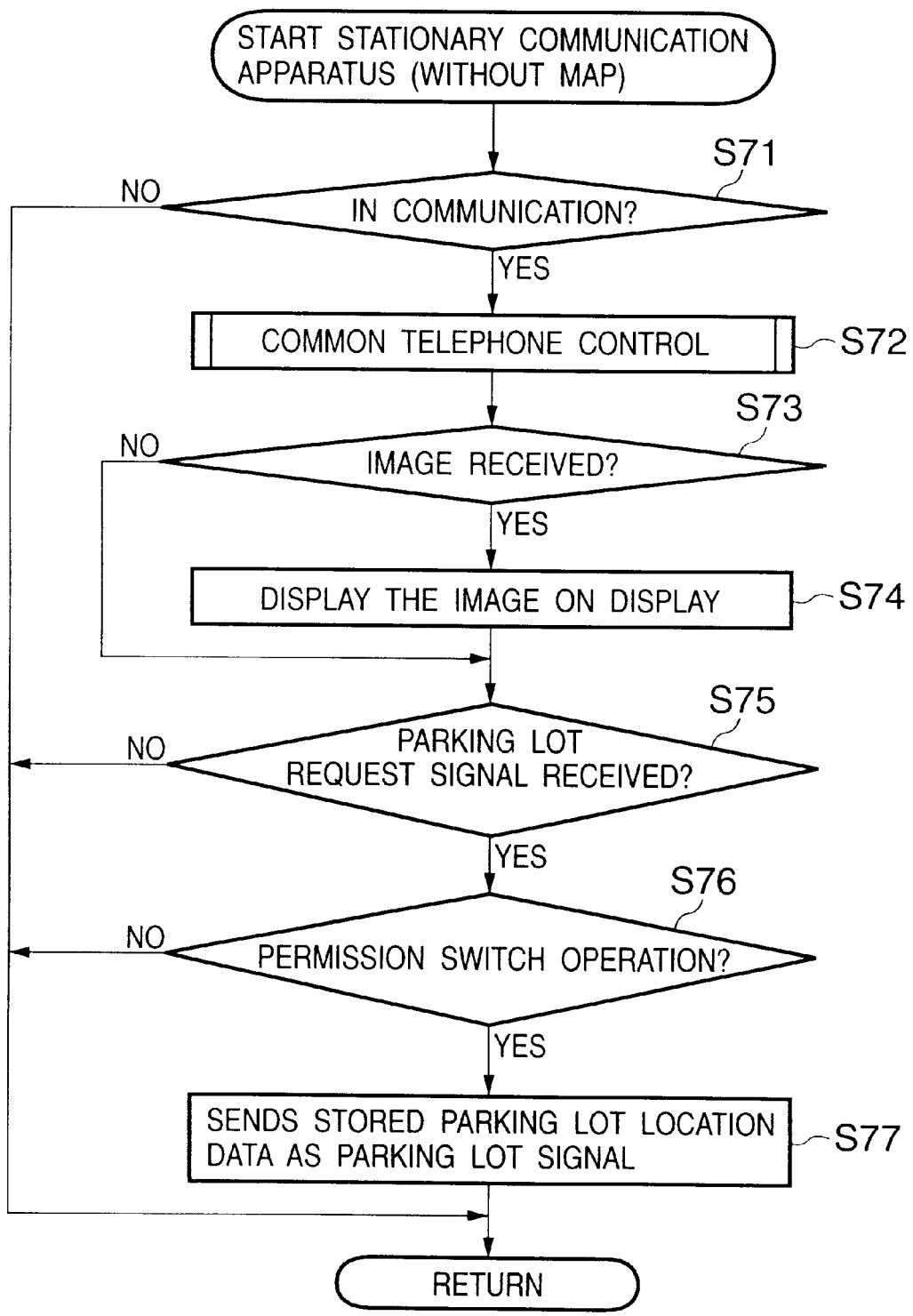
FIG. 13 is a flowchart showing an operation control process (without a map data) in a communication apparatus 9 according to the first embodiment.

FIG. 13 is a flowchart showing an operation control process in the communication apparatus 9 (without the geographical data) according to the first embodiment, which is a software procedure executed by the microcomputer 91.

Steps S71, S72 in FIG. 13: It is determined whether or not the external communication apparatus 9 is in communication with mobile phone 3 of the navigation unit 1 (step S71). If the determination is NO (not in communication), the process returns. If the determination is YES (in communication), a communication process for a common telephone is performed (step S72).

Steps S73, S74: It is determined whether or not image data including a map image is received from the navigation unit 1 over a communication line currently established (Step S73). If the determination is NO (the data is not received), the process proceeds to step S75. If the determination is YES (the data is received) an image including the map image and a photograph image is displayed on the display 92 according to the received image data.

Step S75: It is determined whether a parking lot request signal is received from the navigation unit 1 over the communication line currently established. If the determination is NO (the signal is not received), the process returns. If the determination is YES (the signal is received), the process proceeds to step S76.

Steps S76, S77: It is determined whether or not a predetermined switch operation is performed for permitting a predetermined position information on a parking lot (coordinate information) to be sent to the navigation unit 1 (step S76). If the determination is NO (the operation is not performed), the process returns. If the determination is YES (the operation is performed), a signal including the position information (coordinate information) on the parking lot is sent to the navigation unit 1 over the communication line currently established.

Figure 14:
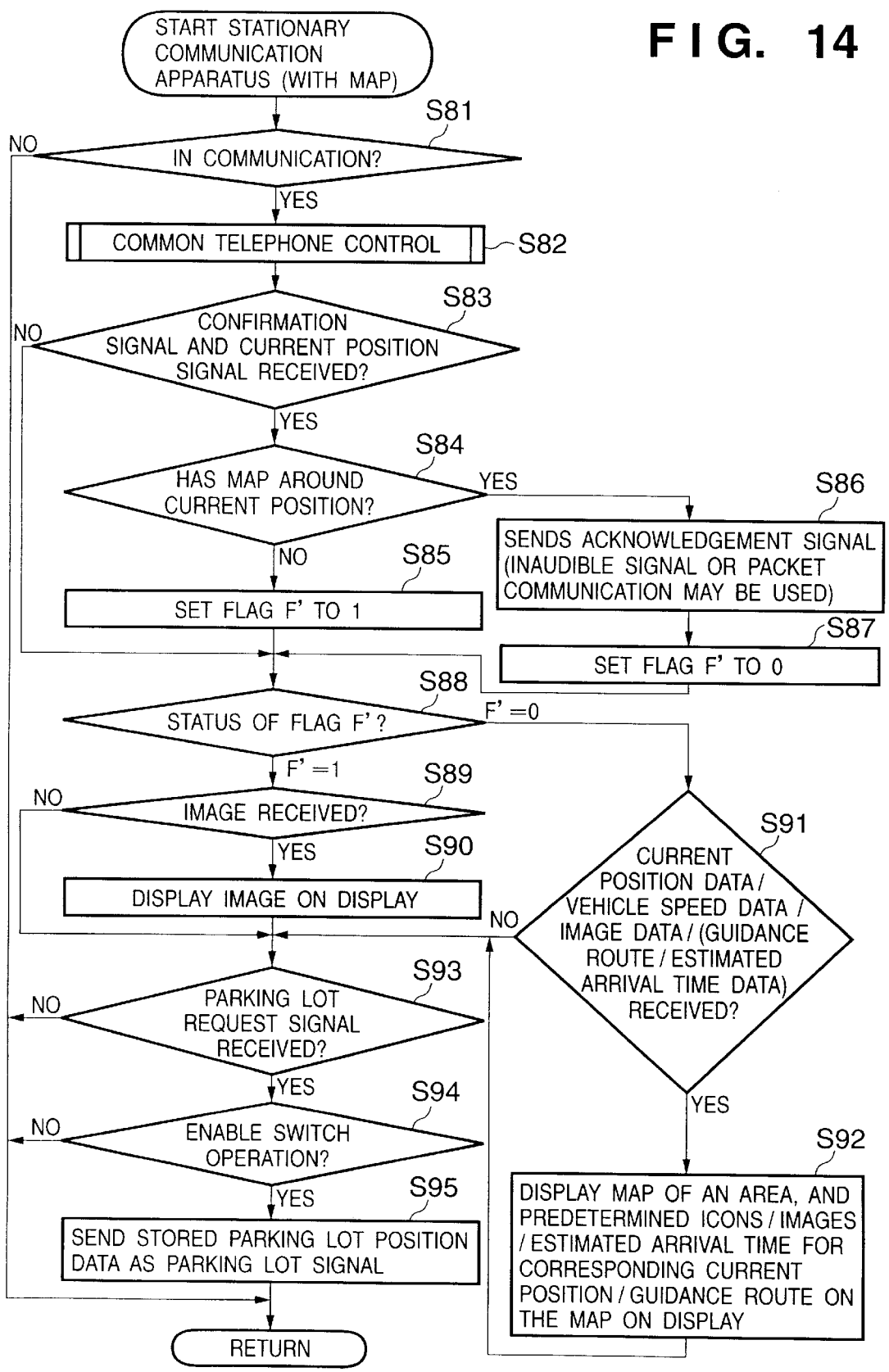
FIG. 14 is a flowchart showing an operation control process (with a map data) in a communication apparatus 9 according to the first embodiment.

FIG. 14 is a flowchart of a operation control process in the communication apparatus 9 (with the geographical data) according to the first embodiment, which is a software procedure executed by the microcomputer 91.

Steps S81, S82 in FIG. 14: It is determined whether or not the external communication apparatus 9 is in communication with mobile phone 3 of the navigation unit 1 (step S81). If the determination is NO (not in communication), the process returns. If the determination is YES (in communication), a communication process for a common telephone is performed (step S82).

Steps S83 to S85: It is determined whether a confirmation signal and a signal including the current position information are received from the navigation unit 1 over the communication line currently established (step S83). If the determination is NO (the signals are not received), the process proceeds to step S88. If the determination at step S83 is YES (the signals are received), it is determined, based on the received current position information, whether geographical data about the area around the current position is contained in any of its own devices (for example, the storage device 95) (step S84). If it is determined that the communication apparatus 9 has the geographical data about the area around the current position, the process proceeds to step S86. If it is determined that it does not contain the data, a internal processing flag, F', is set to "1" (step S85).

Steps S86, S87: An acknowledgement signal indicating that it has the geographical data about the area around the current position is sent to the navigation unit 1 over the communication line currently established (step S86) and internal processing flag F' is reset to "0" (step S87).

Step S88: The state of internal processing flag F' is determined and, the process proceeds to step S89 if the determination is F'=1, or proceeds to step S91 if the determination is F'=0.

Figure 15:
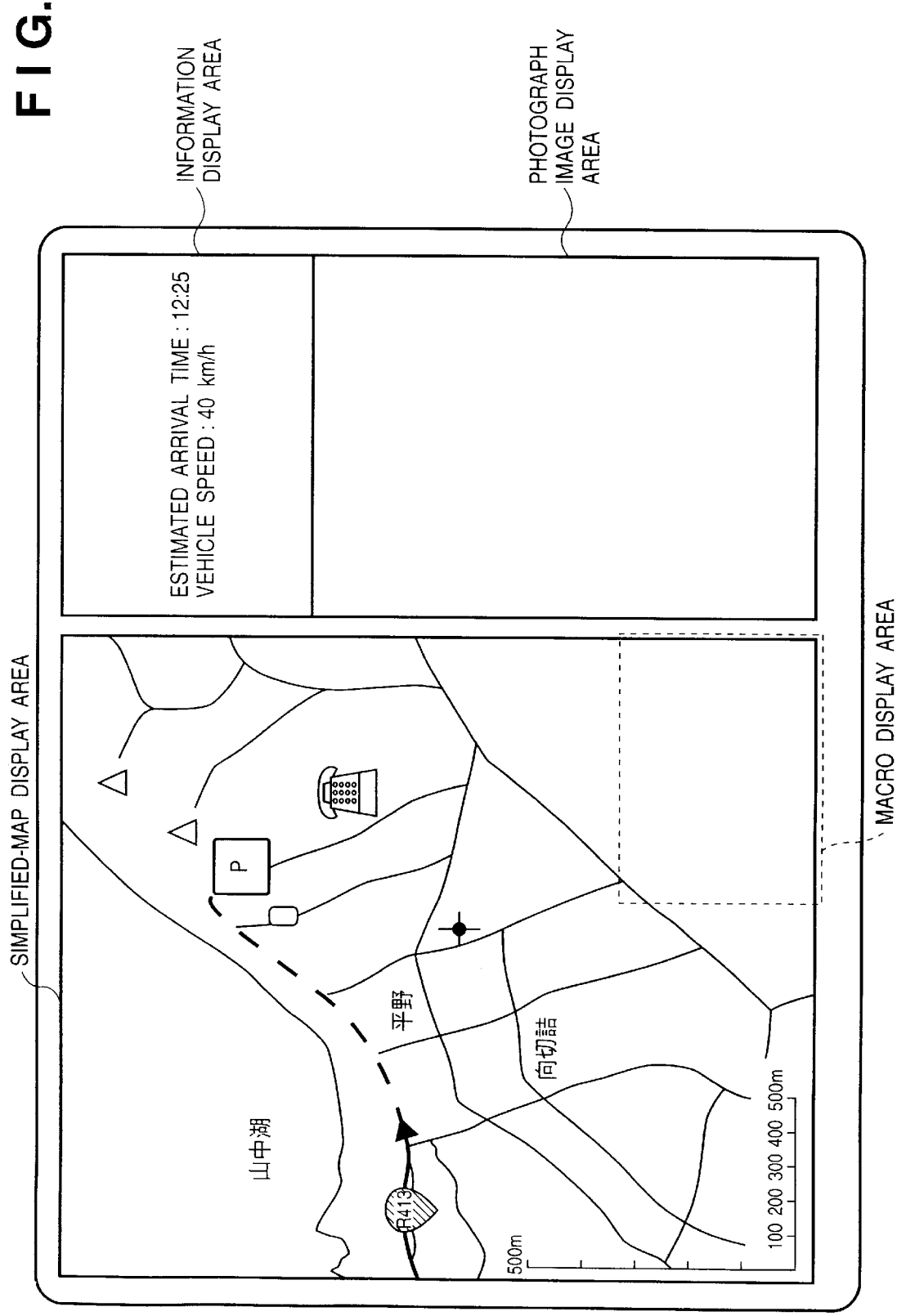
FIG. 15 is a diagram illustrating an image displayed by the communication apparatus 9 according to received image data in a predetermined format or according to geographical data contained in the apparatus and received information about the current position of the navigation unit 1.

Steps S89, S90: It is determined whether image data including a map image is received from the navigation unit 1 over the communication line currently established (step S89). If the determination is NO (the data is not received), the process proceeds to step S98. If the determination is YES (the data is received), an image (see FIG. 15) including the map image and a photograph image is displayed on the display 92 according to the received image data (step S90).

Steps S91, S92: It is determined whether or not current position information, vehicle speed information, image data representing a map image, and coordinate information representing a guidance route if the guidance route is set, and estimated arrival time information are received over the communication line currently established (step S91). If the determination is No (the information is not received), the process proceeds to step S93. If the determination is YES (the information is received), an image including the map image and photograph image (see FIG. 15) is displayed on the display 92 by using the various items of information received at step S91 and the geographical data contained in the own device (for example the storage device 95) and following a procedure similar to the display process in the navigation unit 1 (step S5 in FIG. 3) (step S92).

Steps S93 to S95: A process similar to the process from step S93 to S95 described above with reference to FIG. 13 is performed. Then the process returns to the start.

According to the first embodiment described above, the image data representing the map image and photograph image of the current position of the vehicle in which the navigation unit 1 is installed and the area around it is sent to the communication apparatus 9 if the communication apparatus 9 does not have the geographical data. Therefore, the communication apparatus 9 can display an image including the map image and photograph image of the current position of the vehicle and its surrounding area on the display 92 of the communication apparatus 9 by displaying the image according to the received image data.

That is, according to the first embodiment, a communication apparatus, its current position communication method, and computer-readable medium are implemented for sending input photograph information, image information representing the current position and its surrounding area to an external communication apparatus. Thus, the operator of the communication apparatus can send image information including a photograph image of the current position of the operator that is shot by, for example, a digital camera 4, and the map image of the area around that position to a remote party to easily communicate the circumstance of the operator's current position to the remote party having a common computer.

[Second Embodiment]

A second embodiment based on the configuration of the navigation unit (FIG. 1) and the general configuration of the communication system (FIG. 2) according to the first embodiment will be described below.

In the following description, the description of components similar to those of the first embodiment will be omitted and the focus of the description will be put on components specific to the second embodiment.

The configuration of a navigation unit is substantially the same as that of the first embodiment (FIG. 1), except that a digital camera 4 includes, in addition to common imaging devices such as a CCD (Charge-Coupled Device), a compass 42 that can detects a shooting direction and a GPS sensor 43 for detecting the current position of the unit based on a GPS signal received.

Photograph data (image data) shot by the digital camera 4 has a data format including fields containing identification (ID) data for each photograph, photograph data generated by an imaging device, coordinate data (latitude, longitude, altitude) representing a shooting position detected by the GPS sensor 43, direction data detected by the compass 42, and date data on which the photograph data is generated.

The photograph data is not limited to the data acquired by the digital camera 4 as described above. Photograph data scanned and transferred by a scanner into an external personal computer may be acquired through a communication line using the mobile phone 3 or other devices, or through a removable storage medium.

The configuration of the entire communication system and the general configuration of the navigation unit and external communication apparatus of the second embodiment are the same as those of the first embodiment shown in FIG. 2.

[Data Communication Process]

A data communication process included in operation control processing performed by the navigation unit 1 and communication apparatus 9 will be outlined below.

The navigation unit 1 sends map image information representing a map image of an area around the current position of an automobile (vehicle) in which the unit 1 is installed to the communication apparatus 9.

The map image information includes the symbol image that allows identification of the current position of the navigation unit 1, a traveled path along which the own vehicle has traveled, and a guidance route to a destination, as well as the times (times and date) at which the vehicle traveled along the path, a message, photograph (or its thumbnail image) or other information.

The data format of the map image information may be chosen from data formats, such as the so-called bitmap, JPEG, and GIF, that can be readily reproduced by a typical personal computer, depending on conditions such as a data transfer rate of the communication line used and the fineness of map images to be displayed on the communication apparatus 9.

According to the present embodiment, the communication apparatus 9 can readily display received map image information on the display 92 without the need for including a display processing module (software or hardware) for processing geographical information and map images based on that geographical information conforming the same specifications as those for the geographical data 12 in the navigation unit 1. Thus, the operator of the communication apparatus 9 can identify the position and passage of the vehicle in which the navigation unit 1 is installed by viewing the map image displayed.

The operation control process in the navigation unit 1 and the communication apparatus 9 will be described below in detail. The navigation unit 1 in the present embodiment is powered from a battery in the vehicle in which the unit is installed and has a configuration that allows the communication process described below to be executed even if the ignition system is turned off.

<Operation Control Process in the Navigation Unit 1>

Figure 16:
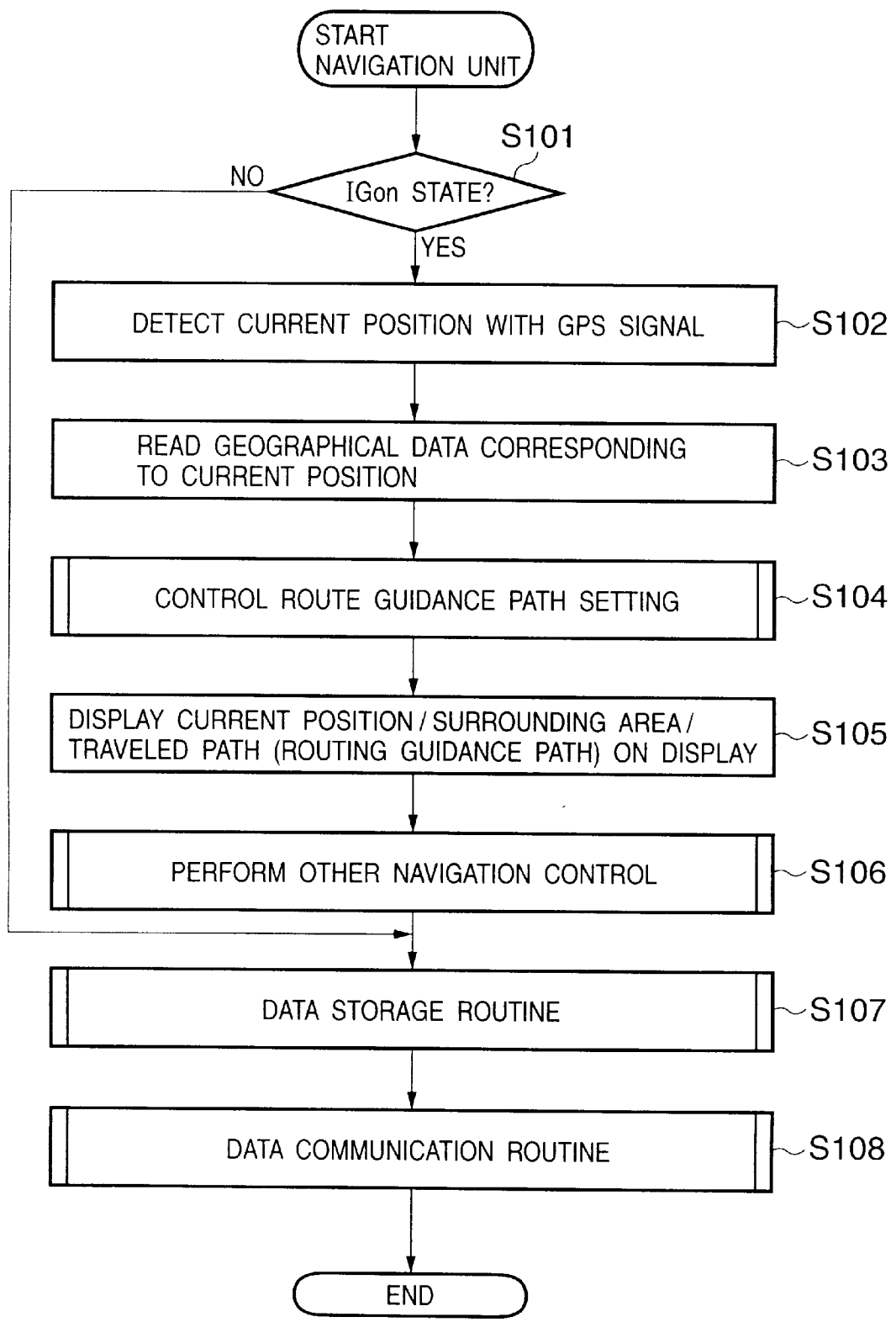
FIG. 16 is a flowchart showing an operation control process in a navigation unit 1 according to a second embodiment.

FIG. 16 is a flowchart showing the operation control process in the navigation unit 1 in the second embodiment and illustrating a software procedure executed by the microcomputer 11.

Steps S101, S102 in FIG. 16: It is determined whether the ignition switch (not shown) of the vehicle in which the navigation is installed is turned on or not (step S101). If the determination is NO (ignition: off), the process proceeds to step S107. If the determination is YES (ignition: on), the current position (coordinate information consisting of latitude and longitude data) of the vehicle is calculated by using a commonly used method based on an output signal from a GPS sensor 13 (step S102)

Steps S103, S104: Geographical information about the area around the current position is read from the geographical data 12 based on the coordinate information of the current position calculated at step S102 (step S103) and a guidance route to a desired destination specified is set (step S104).

Steps S105, S106: A map image containing the current position, surrounding area, traveled path (guidance route) and other information is displayed on the display 8 on a desired scale set by the driver by using the geographical information read at step S103 and following a procedure as with a typical navigation apparatus (step S105). Navigation such as routing guidance using the microphone/loudspeaker unit 6 and HUD 7 is performed (step S106).

Step S107: A data storage process is performed for storing various items of data to be sent to an external communication apparatus.

Step S108: A data communication process, which is a feature of the present invention, is performed.

The process from step S101 to S106 described above is performed with techniques commonly used and the detailed description of which is omitted herein.

Figure 17:
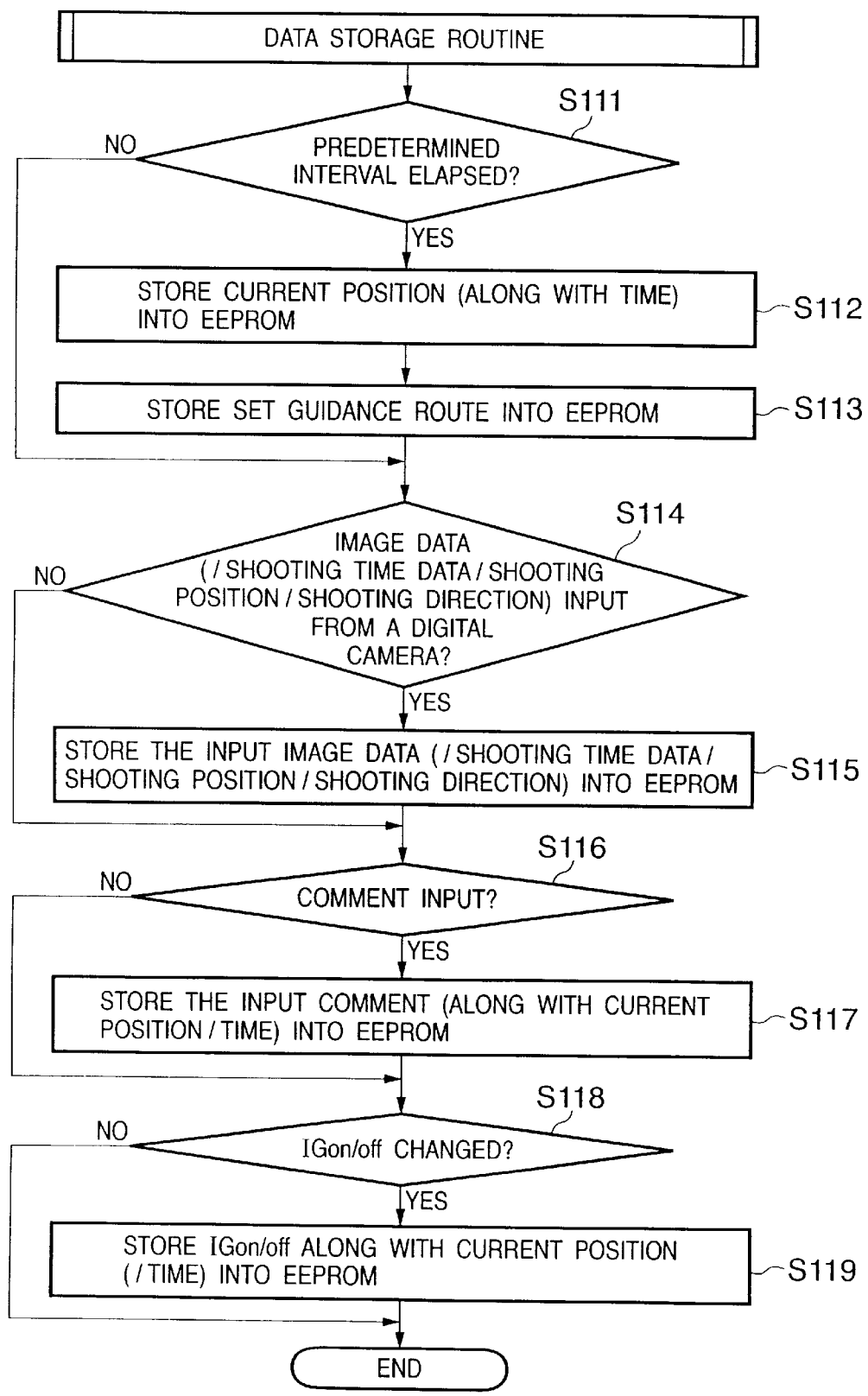
FIG. 17 is a flowchart showing a data storage process in the navigation unit 1 according to the second embodiment.

FIG. 17 is the flowchart of the data storage process performed in the navigation unit 1 according to the second embodiment and shows the details of step S107 in FIG. 16.

Steps S111 to S113 in FIG. 17: It is determined whether a predetermined time interval (for example 10 minutes) has elapsed or not (step S111). If the determination is NO (the predetermined time interval has not elapsed), the process proceeds to step S114. If the determination at step 111 is YES (the predetermined time interval has elapsed), the current position detected at step S102 and the time at the current position are stored in memory (a storage medium) 14 such as EEPROM (step S112) and, if a guidance route is set at step S104, guidance route information representing the guidance route is also stored in the memory (step S113). Because the current position is stored in the memory at the predetermined time intervals in time sequence by performing these steps, the time-series position information can be used as information representing the path information traveled by the own vehicle.

Steps S114, S115: It is determined whether an operation for inputting photograph data from the digital camera 4 is performed or not (step S114). If the determination is NO (the operation is not performed), the process proceeds to step S116. If the determination is YES (the operation is performed), the input photograph data is stored in the memory (storage medium) 14 such as EEPROM together with the coordinate information (latitude, longitude, and attitude) of a shooting position and shooting direction data associated with the photograph data, and the date on which the photograph data is generated (step S115).

Steps S116, S117: It is determined whether or not an operation for inputting a comment (message) is performed by the manipulation of the navigation manipulation module 2 (step S116). If the determination is NO (the input operation is not performed), the process proceeds to step S118. If the determination is YES (the input operation is performed), the input message data is associated with the current position detected at step S102 and the time at the current position and stored in the memory (storage medium) 14 such as EEPROM (step S117).

Steps S118, S119: It is determined whether the operation status (on/off states) of an ignition key switch (not shown) of the vehicle in which the navigation unit 1 is installed is changed or not (step S118). If the determination is NO (no operation status change), the process is terminated (that is, the process proceeds to step S108 in FIG. 16). If the determination is YES (there is an operation status change), the operation status of the switch is associated with the current position detected at step S102 and the time at the current position and stored in the memory (storage medium) 14 such as EEPROM (step S119), then the process will end.

Figure 18:
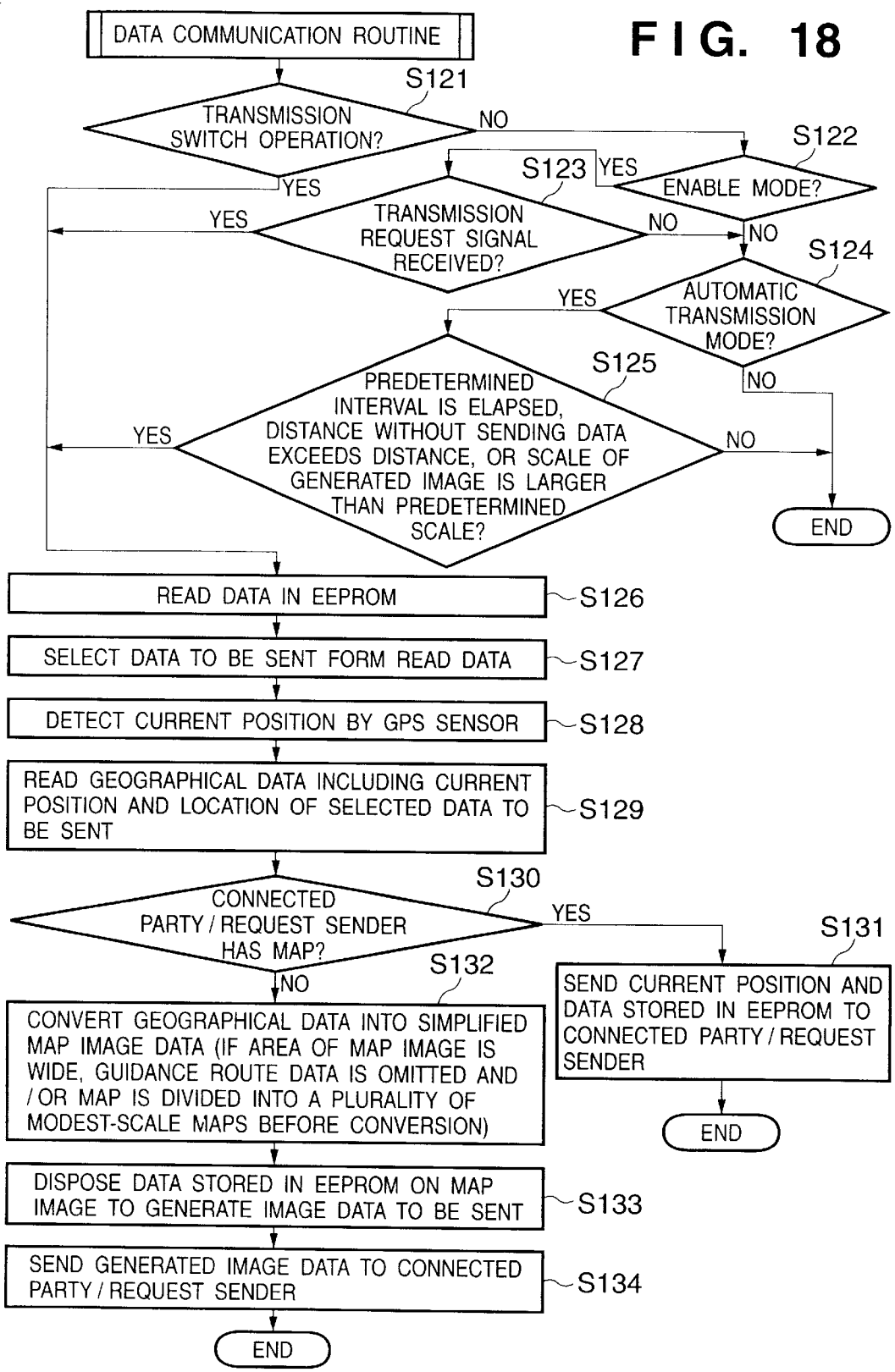
FIG. 18 is a flowchart showing a data communication process in the navigation unit 1 according to the second embodiment.

FIG. 18 is a flowchart of a data communication process performed by the navigation unit 1 according to the second embodiment and shows the details of step S108 in FIG. 16.

Steps S121 in FIG. 18: It is determined whether or not a predetermined switch for starting data transmission is performed by the manipulation of the navigation manipulation module 2. If the determination is YES (the switch is turned on), the process proceeds to step S126. If the determination is NO (the switch is not turned on), the process proceeds to step S122.

Steps S122, S123: The status of a predetermined switch for enabling/disabling data sending/receiving is checked to determine whether the data sending/receiving enable mode is entered or not (step S122). If the determination is YES (enable mode), the process proceeds to step S123. If the determination is NO (disable mode), the process proceeds to step S124.

At step S123, it is determined whether a predetermined signal for requesting data transmission is received from an external communication apparatus (communication apparatus 9). If the determination is YES (the signal is received), the process proceeds to step S126. If the determination is NO (the signal is not received), the process proceeds to step S124. It is assumed that the communication has been established to receive the request signal if the communication line used is a telephone line.

Steps S124, S125: It is determined whether automatic transmission mode for automatically sending data to an external communication apparatus is set or not. If the determination is YES (automatic transmission mode), the process proceeds to step S125. If the determination is NO (manual transmission mode), the process will end (that is, the process returns to step S101 in FIG. 16).

Step S125: It is determined if a predetermined time interval (for example 10 minutes) has elapsed since the last time data is sent, if the distance traveled by the own vehicle without sending data since the last time data is sent to an external communication apparatus exceeds a predetermined distance, or if the scale of a map image represented by image data to be sent is larger than a predetermined scale (that is, a map image of a wider area) If any of these is true, the process proceeds to step S126. Otherwise the process will end.

The scale of a map image represented by image data to be sent will be larger than the predetermined scale if the destination of the distance between the guidance route set and the position of the vehicle in the past, which is data stored in memory 14, has not been sent yet and to be sent during the next data transmission, is too long to contain the two positions in the map image on the predetermined scale.

Steps S126, S127: The data (the latest and past current position information, photograph information, message information, ignition-operation-status information, and other information) stored at step S107 (in the data storage process in FIG. 17) is read from the memory (step S126) and data to be sent at this time is selected from the read data (step S127).

The data selected at step S127 is data that was not sent during the previous data transmission, data that is not stored in the memory, data from the latest position of the vehicle back to the position a predetermined time ago, or data stored during traveling a predetermined distance, in order to minimize the amount of data to be transmitted.

Steps S128, S129: The current position (coordinate information consisting of latitude and longitude data) of the own vehicle is calculated using a common method based on an output signal from a GPS sensor 13 (step S128) (the coordinate information calculated at step S102 in FIG. 16 described above may be used). The location of the party to which the data is to be sent is found by referencing geographical data 12 based on the telephone number of the party and geographical data (coordinate information) about the area containing the current position of the own vehicle and the location of the party (step S129).

Step S130: It is determined whether the party to which the data is to be sent (the sender of the transmission request signal the reception of which is detected at step S123, or the party to which the driver of the own vehicle want to send the data and the operation for sending the data is detected at step S121) is an apparatus that has geographical data conforming the same specifications as those for the navigation unit 1 and can display a map image according to the same procedure for the unit 1, or an apparatus, such as a typical personal computer, having no geographical data. If the determination is YES (the apparatus has geographical data), the process proceeds to step S131. If the determination is NO, the process proceeds to step S132. The determination at step S130 is made by sending a predetermined confirmation signal to the other party from the navigation unit 1 (this process would involve a process for establishing communication line with the other party if the party is the party to which the driver of the own vehicle want to send the data and the operation for sending the data is detected at step S121) and determining whether a predetermined response signal to the confirmation signal is received or not.

Step S131: Because it is determined at step S130 that the apparatus of the other party has geographical data similar to that of the navigation unit 1 and map image display capability based on the geographical data, the data (the current position information consisting of coordinate information, past position information representing the path traveled, guidance route information, and other information) selected at step S127 is sent in an as-is format, then the process will end.

Step S132: Because it is determined at step S130 that the other party's apparatus does not have the geographical data similar to that of the navigation unit 1 and map image display capability based on the geographical data, map image information in a format, such as the so-called bitmap, JPECG, or GIF, that can be reproduced on a typical personal computer must be sent to the communication apparatus in order for the communication apparatus of the other party to display a map image similar to that displayed on the display 8 of the navigation unit 1.

Therefore, at the step S132, the geographical data (coordinate information) read at step S129 is converted into image data (map image information) in any of the above-mentioned data formats.

As described above, the coordinate information is pre-associated with attribute information (information for identifying a road and its rank, a railroad, river, store, and the like) concerning each point corresponding to the coordinate information in order to display a map image perceivable by the driver (operator) on the display 8. Therefore, the coordinate information can be converted into image data simply by pre-setting color information (for example, white for roads, black for railroads, blue for rivers, and red for guidance route) into which each type of the associated attribute information is to be converted and converting each of the attribute information associated with the coordinate information in a area to be converted into the image data into the color information according to the settings.

If all types of attribute information were converted into color information at step 132, the amount of image data to be sent would become large. Therefore, it is preferable that predetermined items (stores and private houses, for example) of the attribute information are not converted into color information that allows the operator to recognize attributes represented by the items of attribute information and the background color, green, for example, of the map image is set for them. This allows a smaller amount of simplified map image information to be generated when it is sent as image data in a predetermined compression format.

Figure 19:
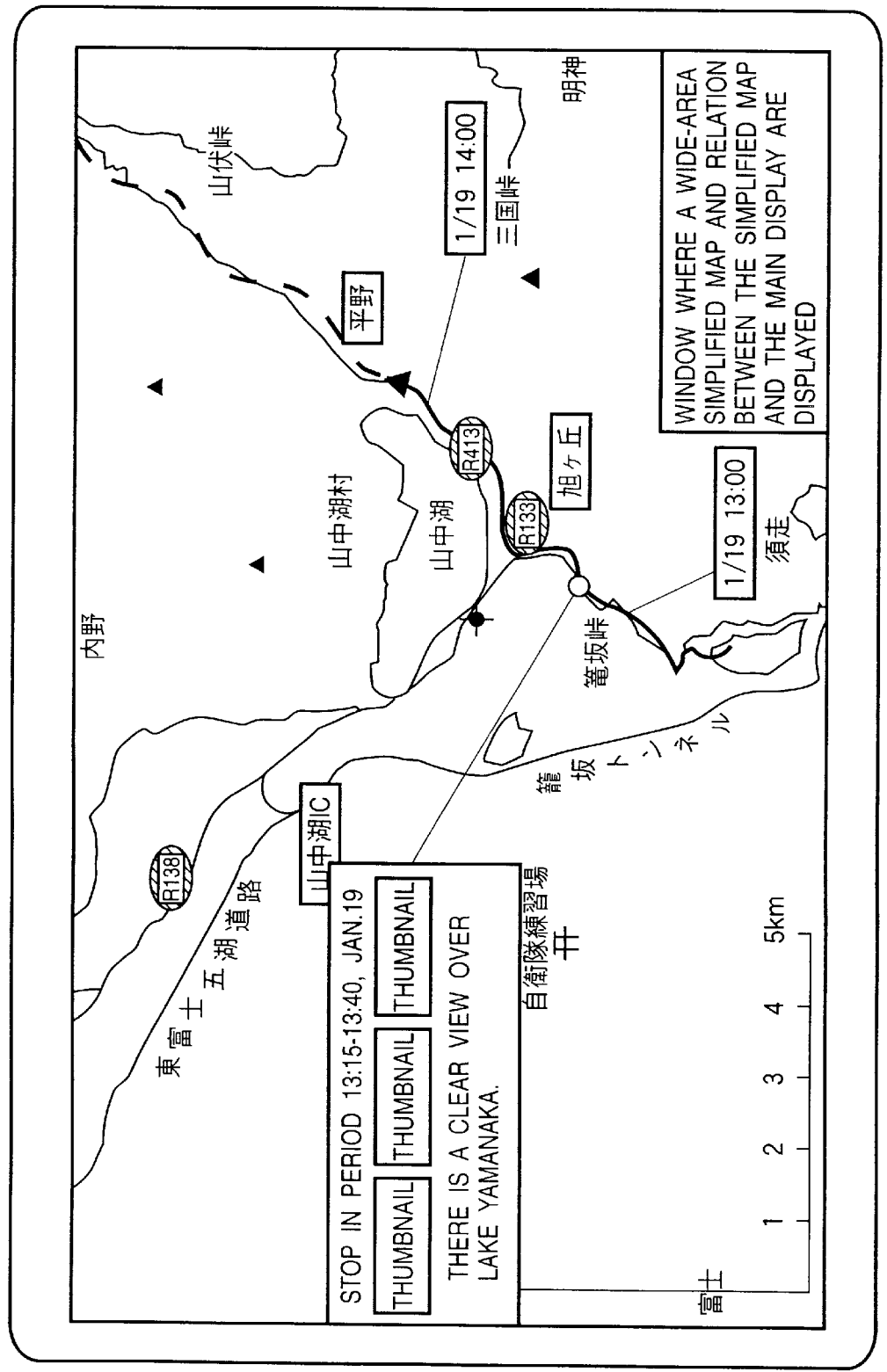
FIG. 19 is a diagram showing an example of the display of a map image displayable on the communication apparatus 9 according to the second embodiment.

If the location of the other party is far from the navigation unit 1 and therefore is not contained in the map image on the predetermined scale provided in the description of step S125, it is preferable that, at step S132, a map image (simplified map image) on a higher scale of a wider area that contains the current position of the own vehicle and the location of the other party is generated in a part (the lower right corner as shown in FIG. 19, for example) of the map image to be sent.

The example of map image shown in FIG. 19 contains the path traveled by the own vehicle, the times at which the vehicle traveled along the path, the current position, guidance route ahead of the current position, thumbnails of photograph data, and messages. Because the location of the other party in this case is far from the vehicle and is not included in the map image of the predetermined scale provided in the description of step S125, a map image (simplified map image) is generated in the lower right corner of the map image in FIG. 19, on a scale that allows both of the current position of the own vehicle and the location of the other party to be contained in the simplified map image.

Steps S133, S134: the image data (map image information) obtained at step S132 is combined with the data selected at step S127 as data to be sent to generate image data representing a map image as illustrated in FIG. 19 (step S133). The generated image data is sent to the other party's communication apparatus over the communication line currently established (step S134), then the process will be terminated.

<Operation Control Process in Communication Apparatus 9>

An operation control process performed in a communication apparatus 9 that does not have geographical data similar to that for the navigation unit 1 and the capability of displaying a map image data based on the geographical data will be described below.

Figure 20:
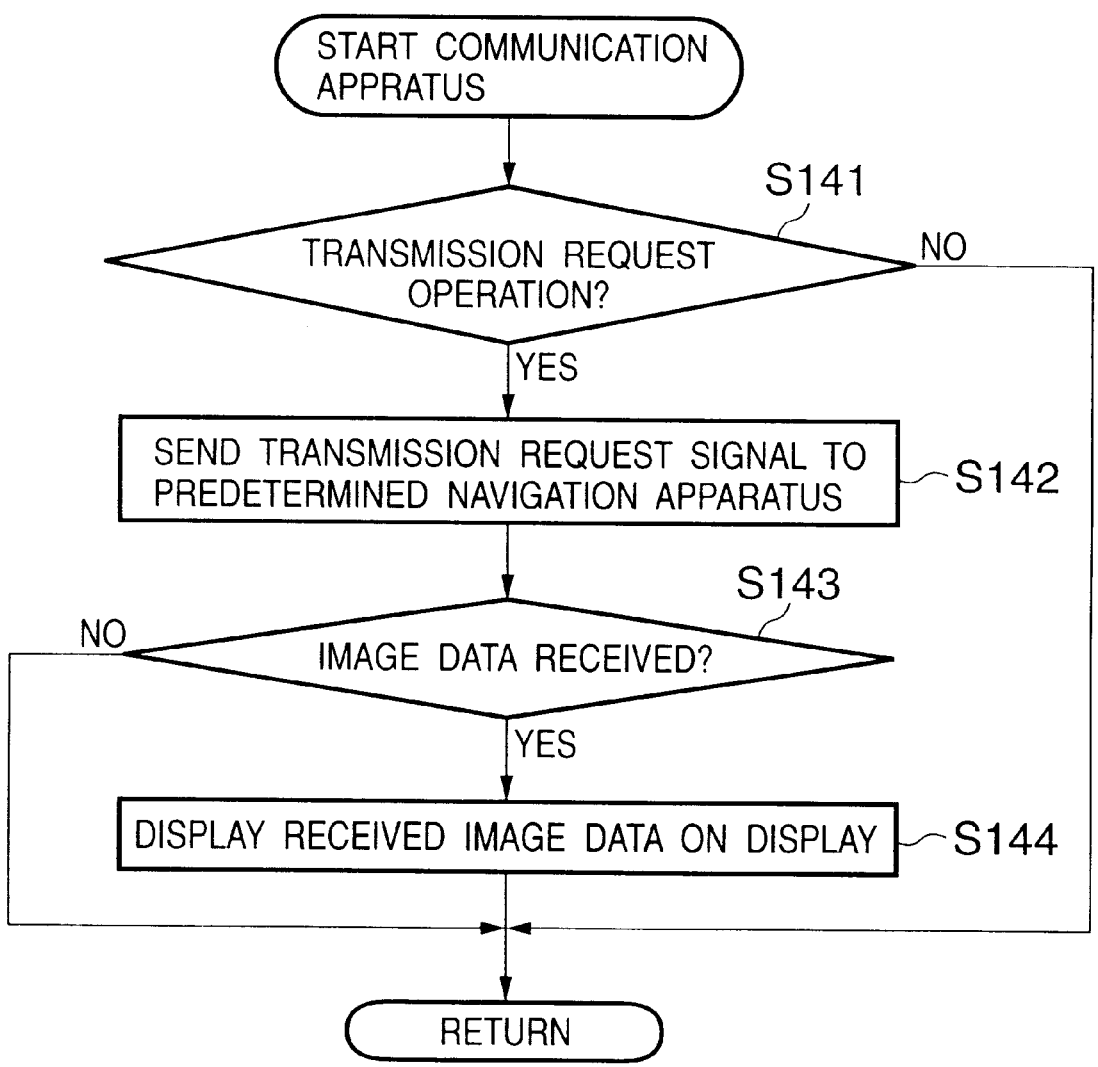
FIG. 20 is a flowchart showing an operation control process in the communication apparatus 9 according to the second embodiment.

FIG. 20 is a flowchart of the operation control process performed in the communication apparatus 9 according to the second embodiment and shows a software procedure executed by a microcomputer 91.

Steps S141, S142 in FIG. 20: It is determined whether a predetermined operation for requesting the transmission of map image information (step S141). If the determination is NO (the operation is not performed), the process returns to step S141. If the determination is YES (the operation is performed), a communication line to the input telephone number of a mobile phone 3 is established and a predetermined transmission request signal for requesting the map image information is sent to a navigation unit 1 to which the mobile phone 3 is attached.

Steps S143, S144: It is determined whether image data including a map image is received from the navigation unit 1 over the communication line currently established (step S143). If the determination is NO (the data is not receive), the process returns to step S141. If the determination is YES (the data is received), the map image (see FIG. 19) is displayed on a display 92 according to the received image data.

According to the second embodiment described above, a path traveled guidance route, photograph information, and messages for an automobile in which the navigation unit 1 is installed can be sent to an external communication apparatus, thus the progress of the movement of the own vehicle can be communicated to the operator of the other party's apparatus to improve convenience, whether the external communication apparatus has geographical data similar to that of the navigation unit 1 and the capability of displaying a map image based on that data or does not have the capability like the above described communication apparatus 9.

That is, according to the second embodiment, a navigation apparatus for a vehicle, its information communication method, and computer-readable storage medium can be provided for sending information about a path traveled by the own vehicle and photograph information. Thus a person driving the vehicle in which the navigation apparatus is installed on a trip can communicate the status of the travel to another person outside the vehicle and the person outside the vehicle can easily guide the driver to a right route, if necessary.

While the second embodiment has been described with respect to the configuration in which the navigation unit 1 and the communication apparatus 9 directly with each other through a communication line, the present invention is not limited to this embodiment. For example, the same advantages as those of the present embodiment can be achieved by employing a system configuration in which image data sent from the navigation unit 1 is temporarily stored in a server computer provided in a commercial information center and the stored image data is downloaded by the operator of the communication apparatus 9 at a desired time like the ordinary form of sending/receiving electronic mail through the server of an Internet service provider, for example.

As many apparently widely different embodiments of the present invention can be made without departing from the spirit and scope thereof, it is to be understood that the invention is not limited to the specific embodiments thereof except as defined in the claims.

What is claimed is:

1. A communication apparatus for communicating with an external communication apparatus by wireless communication, comprising:

interface allowing for inputting photograph information;

an acquisition module for acquiring geographical information representing area around a current position based on position information representing the current position;

an image processing module for generating, based on position information representing the current position and geographical information representing the area acquired by said acquisition module, map image information representing the map image of the area containing a symbol image allowing the current position to be identified and combining the map image information and the photograph information input through the interface into a single piece of image information; and communication device for sending the image information combined by said image processing module to a predetermined external communication apparatus.

2. The communication apparatus according to claim 1, wherein:

the position information representing the current position and the geographical information representing the area are coordinate information representing coordinates in a predetermined coordinate system and the coordinate information is pre-associated with attribute information about a position corresponding to the coordinate information on a position-by-position basis, and said image processing module converts the attribute information pre-associated with the coordinate information representing the current position and the area into color information pre-set for each type of the attribute information to generate the map image information.

3. The communication apparatus according to claim 2, wherein said image processing module generates a simplified map image of the area containing the symbol image without converting an attribute represented by predetermined attribute information of the attribute information into the color information recognizable to an operator when generating the map image information.

4. The communication apparatus according to claim 1, wherein said image processing module sends the image information for one image as a unit at predetermined time intervals.

5. The communication apparatus according to claim 1, wherein said acquisition module acquires position information representing the location of the predetermined external communication apparatus and, based on the position information and the position information representing the current position, acquires geographical information representing an area including the current position and the location of the predetermined external communication apparatus; and said image processing module generates, based on the position information representing the current position and the location and geographical information representing the area, map image information representing the map image of the area including a symbol image allowing the current position and the location to be identified and combines the map image information and the input photograph information into a single piece of image information.

6. The communication apparatus according to claim 1 further comprising a route guidance module for calculating a guidance route to a desired destination and performing route guidance to the destination, wherein:

said image processing module generates the map image information in a manner that a partial image corresponding to the guidance route can be identified in the map image of the area including the symbol image if the location of the predetermined external communication apparatus is set as the destination for the route guidance module.

7. The communication apparatus according to claim 6, wherein said image processing module further combines image information about a character pattern representing an estimated time of arrival at the destination calculated by said route guidance module or the traveling speed of the vehicle thereof with the map image information.

8. The communication apparatus according to claim 1, wherein said image processing module includes a man-machine interface for selecting one of a first mode for sending the position information representing the current position and a second mode for sending the image information.

9. The communication apparatus according to claim 8, wherein said man-machine interface selects the first mode or the second mode depending on the result of sending/receiving predetermined communication information to and from the external communication apparatus.

10. The communication apparatus according to claim 7, wherein the route guidance module displays the position of a parking lot or performing route guidance to the parking lot based on position information representing the location of the parking lot when said communication apparatus receives the position information in response to a predetermined operation.

11. The communication apparatus according to claim 1, wherein said communication apparatus is a communication apparatus installed in a movable body.

12. A computer-readable storage medium containing a control program code operational as the communication apparatus according to claim 1.

13. A computer program product providing instructions, for implementing the operation of a communication apparatus according to claim 1.

14. A current position communication method for a communication apparatus for communicating with an external communication apparatus by wireless communication comprising:

an input step of inputting photograph information;

an acquisition step of acquiring geographical information representing an area around a current position based on position information representing the current position;

an image processing step of generating, based on position information representing the current position and geographical information representing the area, map image information representing the map image of the area containing a symbol image allowing the current position to be identified and combining the map image information and the photograph information into a single piece of image information; and a communication step of sending the image information to a predetermined external communication apparatus.

15. The current position communication method for the communication apparatus according to claim 14, wherein the position information representing the current position and the geographical information representing the area are coordinate information representing coordinates in a predetermined coordinate system and the coordinate information is pre-associated with attribute information about a position corresponding to the coordinate information on a position-by-position basis, and said image processing step comprises a step of converting the attribute-information pre-associated with the coordinate information representing the current position and the area into color information pre-set for each type of the attribute information to generate the map image information.

16. The current position communication method for the communication apparatus according to claim 15, wherein said image processing step comprises the step of generating a simplified map image of the area containing the symbol image without converting an attribute represented by predetermined attribute information of the attribute information into the color information recognizable to an operator when generating the map image information.

17. The current position communication method for the communication apparatus according to claim 14, wherein:

said acquisition step comprising the steps of acquiring position information representing the location of the predetermined external communication apparatus and acquiring, based on the position information and the position information representing the current position, geographical information representing an area including the current position and the location of the predetermined external communication apparatus, and said image processing step comprises a step of generating, based on the position information representing the current position and the location and geographical information representing the area, map image information representing the map image of the area including a symbol image allowing the current position and the location to be identified and combines the map image information and the input photograph information into a single piece of image information.

18. The current position communication method for the communication apparatus according to claim 14, further comprising the route guidance step of calculating a guidance route to a desired destination and performing route guidance to the destination; wherein:

said image processing step comprises a step of generating the map image information in a manner that a partial image corresponding to the guidance route can be identified in the map image of the area including the symbol image if the location of the predetermined external communication apparatus is set as the destination at said route guidance steps.

19. The current position communication method for the communication apparatus according to claim 18, wherein:

said image processing step further comprises a step of combining image information about a character pattern representing an estimated time of arrival at the destination calculated at said route guidance step or the traveling speed of the vehicle thereof with the map image information.

20. The computer program product providing instructions for implementing the current position communication method according to claim 14 in the communication apparatus.

21. The computer-readable storage medium containing a control program code capable of implementing the current position communication method for the communication apparatus according to claim 14.

22. A communication apparatus for communicating with an external communication apparatus by wireless communication, comprising:

interface means allowing for inputting photograph information;

acquisition means for acquiring geographical information representing area around a current position based on position information representing the current position;

image processing means for generating, based on position information representing the current position and geographical information representing the area acquired by said acquisition means, map image information representing the map image of the area containing a symbol image allowing the current position to be identified and combining the map image information and the photograph information input through said interface means into a single piece of image information; and communication means for sending the image information combined by the image processing means to a predetermined external communication apparatus.

23. A computer-readable storage medium containing a control program code operational as the communication apparatus according to claim 22.

24. A computer program product providing instructions for implementing the operation of a communication apparatus according to claim 22.

25. A navigation apparatus for a vehicle comprising a current position detection module for detecting the current position of the navigation apparatus for a vehicle itself and a communication control unit for sending position information representing the detected current position to an external communication apparatus, wherein:

said navigation apparatus for a vehicle comprises interface allowing for inputting photograph information, said current position detection module comprises storage medium for storing the current position information representing the detected current position at a plurality of positions in chronological order to hold a past traveled path, and said communication control unit sends the position information representing the current position to a predetermined external communication apparatus (9) along with the position information about the plurality of positions read from said storage medium in chronological order or photograph information input through said interface.

26. The navigation apparatus for a vehicle according to claim 25, wherein said communication control unit sends information about shooting circumstance associated with the photograph information.

27. The navigation apparatus for a vehicle according to claim 25 further comprising a route guidance module for calculating a guidance route to a desired destination from the current position detected by said current position detection module and performing route guidance to the destination, wherein said communication control unit sends guidance route information representing the guidance route.

28. The navigation apparatus for a vehicle according to claim 27, wherein said communication control unit generates map image information representing the map image of the area based on the position information representing the current position, the geographical information representing the area around the current position, and the guidance route information and sends the map image information to the predetermined external communication apparatus, the map image information containing symbol images allowing the current position and the guidance route to be identified.

29. The navigation apparatus for a vehicle according to claim 28, wherein the position information representing the current position, the geographical information representing the area around the current position, and the guidance route information are coordinate information representing coordinates in a predetermined coordinate system and the coordinate information is pre-associated with attribute information about a position corresponding to the coordinate information on a position-by-position basis; and said communication control unit converts the attribute information pre-associated with the coordinate information representing the current position, the area, and the guidance route information into color information pre-set for each type of the attribute information to generate the map image information.

30. The navigation apparatus for a vehicle according to claim 29, wherein said communication control unit generates a simplified map image of the area containing the symbol image without converting an attribute represented by predetermined attribute information of the attribute information into the color information recognizable to an operator when generating the map image information.

31. The navigation apparatus for a vehicle according to claim 25, wherein said communication control unit automatically performs transmission in response to receiving information indicating a transmission request from the predetermined external communication apparatus.

32. The navigation apparatus for a vehicle according to claim 31, wherein said communication control unit includes a man-machine interface for disabling the automatic information transmission to the predetermined external communication apparatus.

33. The navigation apparatus for a vehicle according to claim 25, wherein said communication control unit sends to the predetermined external communication apparatus only position information about a position that is not sent among the position information about the plurality of positions when sending the position information representing the current position and the information at the plurality of positions.

34. The navigation apparatus for a vehicle according to claim 25, wherein said communication control unit sends to the predetermined external communication apparatus only position information from the latest position information to a position a predetermined time ago among the position information about the plurality of positions when sending the position information representing the current position and the information at the plurality of positions.

35. The navigation apparatus for a vehicle according to claim 25, wherein said communication control unit generates map image information representing the map image of the area based on the position information representing the current position, the geographical information representing the area around the current position, and the position information at the plurality of positions and sends the map image information to said external communication apparatus, the map image information containing symbol images allowing the current position and the past traveled path represented by the position information at the plurality of positions to be identified.

36. The navigation apparatus for a vehicle according to claim 35, wherein the position information representing the current position, the geographical information representing the area, and the position information at the plurality of positions are coordinate information representing coordinates in a predetermined coordinate system and the coordinate information is pre-associated with attribute information about a position corresponding to the coordinate information on a position-by-position basis; and said communication control unit converts the attribute information pre-associated with the coordinate information representing the current position, the area, and the plurality of positions into color information pre-set for each type of the attribute information to generate the map image information.

37. The navigation apparatus for a vehicle according to claim 36, wherein said communication control unit generates a simplified map image of the area containing the symbol image without converting an attribute represented by predetermined attribute information of the attribute information into the color information recognizable to an operator when generating the map image information.

38. The navigation apparatus for a vehicle according to claim 25, wherein said storage medium associates and stores the position information representing the plurality of positions with time information representing time at which the positions are passed, ignition on/off information, or desired message information; and said communication control unit reads from said storage medium and sends to said external communication apparatus the information representing the plurality of positions and the information associated with the position information.

39. The navigation apparatus for a vehicle according to claim 25, wherein said communication control unit sends the position information representing the plurality of positions and the photograph image along with the position information representing the current position.

40. A computer-readable storage medium containing a control program code operational as the navigation apparatus for a vehicle according to claim 25.

41. A computer program product providing instructions for implementing the operation of a navigation apparatus for a vehicle according to claim 25.

42. An information communication method for a navigation apparatus for a vehicle detecting the current position of the navigation apparatus for a vehicle itself and sending information representing the detected current position to an external communication apparatus, comprising:

an input step of inputting photograph information into said navigation apparatus for a vehicle;

a storage step of storing the current position information representing the detected current position at a plurality of positions in chronological order to hold a past traveled path; and an information communication step of sending to a predetermined communication apparatus the position information at the plurality of positions stored in chronological order at said storage step or input photograph information along with the position information representing the current position.

43. The information communication method for the navigation apparatus for a vehicle according to claim 42, wherein information about shooting circumstance associated with the photograph information is sent at said information communication step.

44. The information communication method for the navigation apparatus for a vehicle according to claim 42, wherein guidance route information representing a guidance route from the current position to a desired destination is sent at said information communication step.

45. The information communication method for the navigation apparatus for a vehicle according to claim 44, wherein said information communication step comprises the steps of generating map image information representing the map image of the area based on the position information representing the current position, the geographical information representing the area around the current position, and the guidance route information and sends the map image information to the predetermined external communication apparatus, the map image information containing symbol images allowing the current position and the guidance route to be identified.

46. The information communication method for the navigation apparatus for a vehicle according to claim 42, wherein said information communication step comprises the steps of generating map image information representing the map image of the area based on the position information representing the current position, the geographical information representing the area around the current position, and the position information at the plurality of positions and sending the map image information to the predetermined external communication apparatus, the map image information containing symbol images allowing the current position and the past traveled path represented by the position information at the plurality of positions to be identified.

47. The information communication method for the navigation apparatus for a vehicle according to claim 42, wherein said storage step comprises the step of associating and storing the position information representing the plurality of positions with time information representing time at which the positions are passed, ignition on/off information, or desired message information; and said information communication step comprises a step of sending to the predetermined external communication apparatus the information representing the plurality of positions and the information associated with the position information at said storage step.

48. The computer-readable storage medium containing a control program code capable of implementing the information communication method for the navigation apparatus for a vehicle according to claim 42.

49. The computer program product providing instructions for implementing the information communication method according to claim 42 in said navigation apparatus for a vehicle.

50. A navigation apparatus for a vehicle comprising current position detection means for detecting the current position of the navigation apparatus for a vehicle itself and communication control means for sending position information representing the detected current position to an external communication apparatus, wherein:

said navigation apparatus for a vehicle comprises interface means allowing for inputting photograph information, said current position detection means comprises storage means for storing the current position information representing the detected current position at a plurality of positions in chronological order to hold a past traveled path, and said communication control means sends the position information representing the current position to a predetermined external communication apparatus along with the position information about the plurality of positions read from said storage means in chronological order or photograph information input through said interface means.

51. A computer-readable storage medium containing a control program code operational as the navigation apparatus for a vehicle according to claim 50.

52. A computer program product providing instructions for implementing the operation of a navigation apparatus for a vehicle according to claim 50.

* * * * *